United States Patent
Crabtree et al.

(10) Patent No.: US 11,546,380 B2
(45) Date of Patent: Jan. 3, 2023

(54) SYSTEM AND METHOD FOR CREATION AND IMPLEMENTATION OF DATA PROCESSING WORKFLOWS USING A DISTRIBUTED COMPUTATIONAL GRAPH

(71) Applicant: QOMPLX, Inc., Tysons, VA (US)

(72) Inventors: Jason Crabtree, Vienna, VA (US);
Luka Jurukovski, Arlington, VA (US);
Bhashit Parikh, Reston, VA (US);
Angadbir Salaria, Herndon, VA (US);
Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 278 days.

(21) Appl. No.: 17/035,029

(22) Filed: Sep. 28, 2020

(65) Prior Publication Data

US 2021/0136121 A1 May 6, 2021

Related U.S. Application Data

(63) Continuation-in-part of application No. 17/008,276, filed on Aug. 31, 2020, now Pat. No. 11,323,484,
(Continued)

(51) Int. Cl.
*H04L 9/40* (2022.01)
*G06F 16/951* (2019.01)
*G06F 16/2458* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951
See application file for complete search history.

(56) References Cited

U.S. PATENT DOCUMENTS 7,818,224 B2   10/2010   Boerner
7,818,417 B2   10/2010   Ginis et al.
(Continued)

OTHER PUBLICATIONS

Breitenbücher et al. "Combining declarative and imperative cloud application provisioning based on TOSCA." 2014 IEEE international conference on cloud engineering. IEEE, 2014, pp. 87-96 (Year: 2014).*

*Primary Examiner* — Catherine Thiaw
(74) *Attorney, Agent, or Firm* — Galvin Patent Law LLC; Brian R. Galvin

(57) ABSTRACT

A system and method for creating and implementing data processing workflows using a distributed computational graph comprising modules that represent various stages within a data processing workflow. Each module represents one or more data processing steps, with some of the modules representing data processing performed by a cloud-based service and containing code for interfacing with the application programming interface (API) of that cloud-based service. A series of modules and their interconnections specify the workflow. Data is processed according to the workflow by implementing the data processing step represented by each module, some of which may access cloud-based data processing services. The result is that users can create complex data processing workflows that utilize cloud-based services to process data without having to know how to access the cloud-based data processing services, or even know that they exist.

2 Claims, 14 Drawing Sheets

Related U.S. Application Data which is a continuation-in-part of application No. 17/000,504, filed on Aug. 24, 2020, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, which is a continuation-in-part of application No. 14/925,974, filed on Oct. 28, 2015, now abandoned, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/855,724, filed on Apr. 22, 2020, now Pat. No. 11,218,510, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/813,097, filed on Nov. 14, 2017, now abandoned, which is a continuation-in-part of application No. 15/616,427, filed on Jun. 7, 2017, now abandoned, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/806,697, filed on Nov. 8, 2017, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/806,697, filed on Nov. 8, 2017, now abandoned, which is a continuation-in-part of application No. 15/343,209, filed on Nov. 4, 2016, now Pat. No. 11,087,403, which is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, which is a continuation-in-part of application No. 15/206,195, filed on Jul. 8, 2016, now abandoned, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/673,368, filed on Aug. 9, 2017, now abandoned, which is a continuation-in-part of application No. 15/376,657, filed on Dec. 13, 2016, now Pat. No. 10,402,906, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/849,901, filed on Dec. 21, 2017, now Pat. No. 11,023,284, which is a continuation-in-part of application No. 15/835,312, filed on Dec. 7, 2017, now Pat. No. 11,055,451, which is a continuation-in-part of application No. 15/186,453, filed on Jun. 18, 2016, now abandoned, application No. 17/035,029, which is a continuation-in-part of application No. 17/008,276, filed on Aug. 31, 2020, now Pat. No. 11,323,484, which is a continuation-in-part of application No. 17/000,504, filed on Aug. 24, 2020, which is a continuation-in-part of application No. 16/412,340, filed on May 14, 2019, which is a continuation-in-part of application No. 16/267,893, filed on Feb. 5, 2019, which is a continuation-in-part of application No. 16/248,133, filed on Jan. 15, 2019, which is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, which is a continuation-in-part of application No. 15/141,752, filed on Apr. 28, 2016, now Pat. No. 10,860,962.

(60) Provisional application No. 62/568,307, filed on Oct. 4, 2017, provisional application No. 62/568,305, filed on Oct. 4, 2017, provisional application No. 62/568,312, filed on Oct. 4, 2017, provisional application No. 62/568,298, filed on Oct. 4, 2017, provisional application No. 62/568,291, filed on Oct. 4, 2017.

(56) References Cited

U.S. PATENT DOCUMENTS

| | | |
|---|---|---|
| 7,840,677 B2 | 11/2010 | Li et al. |
| 8,069,190 B2 | 11/2011 | McColl et al. |
| 9,338,061 B2 | 5/2016 | Chen et al. |
| 9,639,575 B2 | 5/2017 | Leida et al. |
| 10,168,691 B2 | 1/2019 | Zornio et al. |
| 10,740,358 B2 | 8/2020 | Chan et al. |
| 2007/0055558 A1* | 3/2007 | Shanahan .............. G06Q 10/06 705/7.26 |
| 2011/0078426 A1* | 3/2011 | Stoitsev ................. G06Q 10/04 718/107 |
| 2013/0290554 A1 | 10/2013 | Chen et al. |
| 2016/0092557 A1 | 3/2016 | Stojanovic et al. |
| 2016/0103706 A1* | 4/2016 | Novaes ................. G06F 9/4881 718/102 |
| 2017/0006135 A1 | 1/2017 | Siebel et al. |
| 2017/0090893 A1 | 3/2017 | Aditya et al. |

* cited by examiner

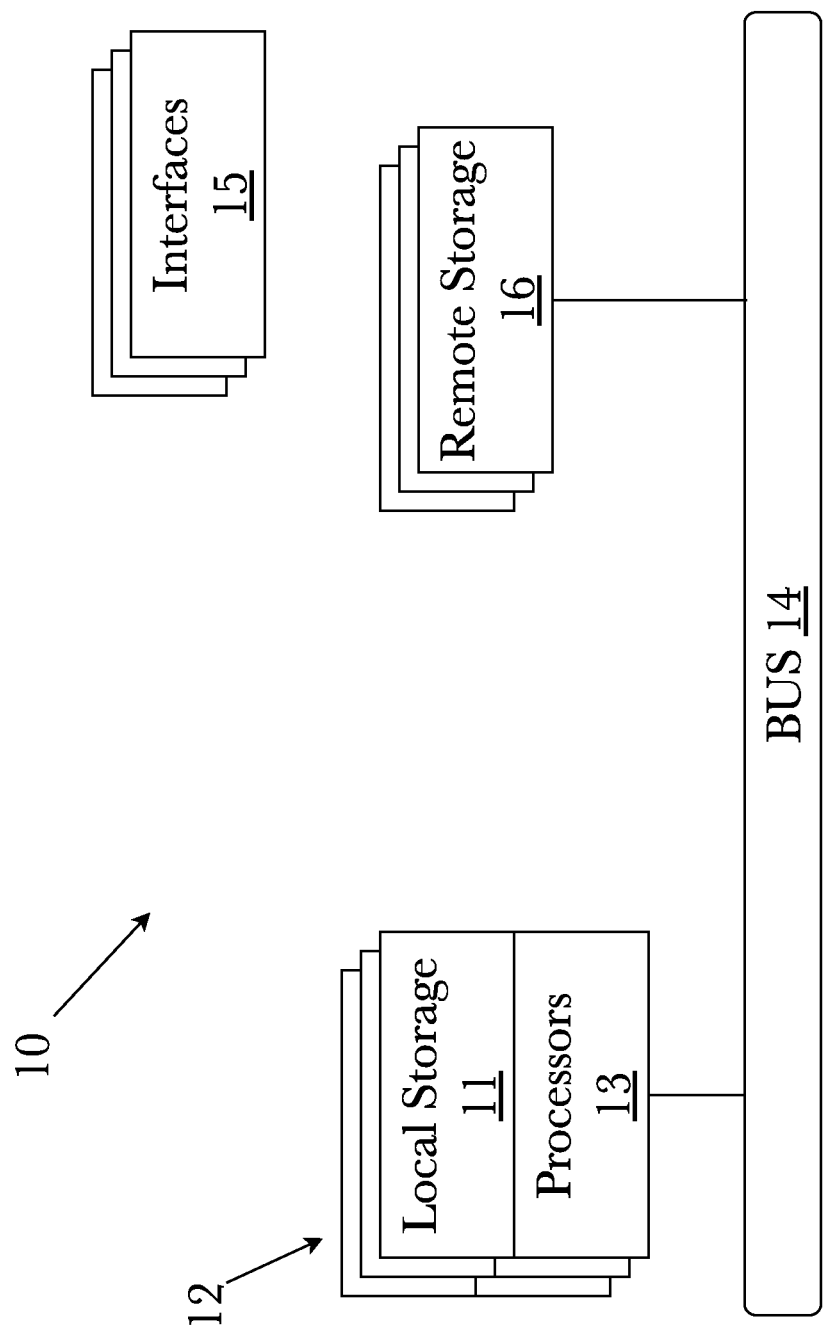

SYSTEM AND METHOD FOR CREATION AND IMPLEMENTATION OF DATA PROCESSING WORKFLOWS USING A DISTRIBUTED COMPUTATIONAL GRAPH

CROSS-REFERENCE TO RELATED APPLICATIONS

| Application No. | Date Filed | Title |
| --- | --- | --- |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/855,724 | Apr. 22, 2020 | ADVANCED CYBERSECURITY THREAT MITIGATION USING SOFTWARE SUPPLY CHAIN ANALYSIS |
| | | which is a continuation-in-part of: |
| 16/836,717 | Mar. 31, 2020 | HOLISTIC COMPUTER SYSTEM CYBERSECURITY EVALUATION AND SCORING |
| | | which is a continuation-in-part of: |
| 15/887,496 U.S. Pat. No. 10,783,241 | Feb. 2, 2018 Issue Date Sep. 22, 2020 | SYSTEM AND METHODS FOR SANDBOXED MALWARE ANALYSIS AND AUTOMATED PATCH DEVELOPMENT, DEPLOYMENT AND VALIDATION |
| | | which is a continuation-in-part of: |
| 15/818,733 U.S. Pat. No. 10,673,887 | Nov. 20, 2017 Issue Date Jun. 2, 2020 | SYSTEM AND METHOD FOR CYBERSECURITY ANALYSIS AND SCORE GENERATION FOR INSURANCE PURPOSES |
| | | which is a continuation-in-part of: |
| 15/725,274 U.S. Pat. No. 10,609,079 | Oct. 4, 2017 Issue Date Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of: |
| 15/655,113 U.S. Pat. No. 10,735,456 | Jul. 20, 2017 Issue Date Aug. 4, 2020 | ADVANCED CYBERSECURITY THREAT MITIGATION USING BEHAVIORAL AND DEEP ANALYTICS |
| | | which is a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of: |
| 15/166,158 | May 26, 2016 | SYSTEM FOR AUTOMATED CAPTURE AND ANALYSIS OF BUSINESS |

-continued

| Application No. | Date Filed | Title |
|---|---|---|
| | | INFORMATION FOR SECURITY AND CLIENT-FACING INFRASTRUCTURE RELIABILITY |
| | | which is a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION |
| | | which is a continuation-in-part of: |
| 15/091,563 U.S. Pat. No. 10,204,147 | Apr. 5, 2016 Issue Date Feb. 12, 2019 | SYSTEM FOR CAPTURE, ANALYSIS AND STORAGE OF TIME SERIES DATA FROM SENSORS WITH HETEROGENEOUS REPORT INTERVAL PROFILES |
| | | and is also a continuation-in-part of: |
| 14/986,536 U.S. Pat. No. 10,210,255 | Dec. 31, 2015 Issue Date Feb. 19, 2019 | DISTRIBUTED SYSTEM FOR LARGE VOLUME DEEP WEB DATA EXTRACTION |
| | | and is also a continuation-in-part of: |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED CYBERSECURITY THREAT MITIGATION USING SOFTWARE SUPPLY CHAIN ANALYSIS |
| | | which is a continuation-in-part of: |
| 16/855,724 | Apr. 22, 2020 | ADVANCED CYBERSECURITY THREAT MITIGATION USING SOFTWARE SUPPLY CHAIN ANALYSIS |
| | | which is a continuation-in-part of: |
| 16/836,717 | Mar. 31, 2020 | HOLISTIC COMPUTER SYSTEM CYBERSECURITY EVALUATION AND SCORING |
| | | which is a continuation-in-part of: |
| 15/887,496 U.S. Pat. No. 10,783,241 | Feb. 2, 2018 Issue Date Sep. 22, 2020 | SYSTEM AND METHODS FOR SANDBOXED MALWARE ANALYSIS AND AUTOMATED PATCH DEVELOPMENT, DEPLOYMENT AND VALIDATION |
| | | which is a continuation-in-part of: |
| 15/823,285 U.S. Pat. No. 10,740,096 | Nov. 27, 2017 Issue Date Aug. 11, 2020 | META-INDEXING, SEARCH, COMPLIANCE, AND TEST FRAMEWORK FOR SOFTWARE DEVELOPMENT |
| | | which is a continuation-in-part of: |
| 15/788,718 | Oct. 19, 2017 | DATA MONETIZATION AND EXCHANGE PLATFORM |
| | | which claims priority, and benefit to: |
| 62/568,307 | Oct. 4, 2017 | DATA MONETIZATION AND EXCHANGE PLATFORM |
| | | and is also a continuation-in-part of: |
| 15/788,002 | Oct. 19, 2017 | ALGORITHM MONETIZATION AND EXCHANGE PLATFORM |
| | | which claims priority, and benefit to: |
| 62/568,305 | Oct. 4, 2017 | ALGORITHM MONETIZATION AND EXCHANGE PLATFORM |
| | | and is also a continuation-in-part of: |
| 15/787,601 | Oct. 18, 2017 | METHOD AND APPARATUS FOR CROWDSOURCED DATA GATHERING, EXTRACTION, AND COMPENSATION |
| | | which claims priority, and benefit to: |
| 62/568,312 | Oct. 4, 2017 | METHOD AND APPARATUS FOR CROWDSOURCED DATA GATHERING, EXTRACTION, AND COMPENSATION |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED |

-continued

| Application No. | Date Filed | Title |
|---|---|---|
| 14/925,974 | Oct. 28, 2015 | COMPUTATIONAL GRAPH<br>which is a continuation-in-part of:<br>RAPID PREDICTIVE ANALYSIS OF VERY LARGE DATA SETS USING THE DISTRIBUTED COMPUTATIONAL GRAPHY |
| Current application | Herewith | SYSTEM AND METHOD FOR CREATION AND IMPLEMENTATION OF DATA PROCESSING WORKFLOWS USING A DISTRIBUTED COMPUTATIONAL GRAPH<br>Is a continuation-in-part of: |
| 17/008,276 | Aug. 31, 2020 | PRIVILEGE ASSURANCE OF ENTERPRISE COMPUTER NETWORK ENVIRONMENTS<br>which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS<br>which is a continuation-in-part of: |
| 16/855,724 | Apr. 22, 2020 | ADVANCED CYBERSECURITY THREAT MITIGATION USING SOFTWARE SUPPLY CHAIN ANALYSIS<br>which is a continuation-in-part of: |
| 16/777,270 | Jan. 30, 2020 | CYBERSECURITY PROFILING AND RATING USING ACTIVE AND PASSIVE EXTERNAL RECONNAISSANCE<br>which is a continuation-in-part of: |
| 16/720,383 | Dec. 19, 2019 | RATING ORGANIZATION CYBERSECURITY USING ACTIVE AND PASSIVE EXTERNAL RECONNAISSANCE<br>which is a continuation of: |
| 15/823,363<br>U.S. Pat. No.<br>10,560,483 | Nov. 27, 2017<br>Issue Date<br>Feb. 11, 2020 | RATING ORGANIZATION CYBERSECURITY USING ACTIVE AND PASSIVE EXTERNAL RECONNAISSANCE<br>which is a continuation-in-part of: |
| 15/725,274<br>U.S. Pat. No.<br>10,609,079 | Oct. 4, 2017<br>Issue Date<br>Mar. 31, 2020 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| Current application | Herewith | SYSTEM AND METHOD FOR CREATION AND IMPLEMENTATION OF DATA PROCESSING WORKFLOWS USING A DISTRIBUTED COMPUTATIONAL GRAPH<br>Is a continuation-in-part of: |
| 17/008,276 | Aug. 31, 2020 | PRIVILEGE ASSURANCE OF ENTERPRISE COMPUTER NETWORK ENVIRONMENTS<br>which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS<br>which is a continuation-in-part of: |
| 16/412,340 | May 14, 2019 | SECURE POLICY-CONTROLLED PROCESSING AND AUDITING ON REGULATED DATA SETS<br>which is a continuation-in-part of: |
| 16/267,893 | Feb. 5, 2019 | SYSTEM AND METHODS FOR DETECTING AND CHARACTERIZING ELECTROMAGNETIC EMISSIONS<br>which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS<br>which is a continuation-in-part of: |
| 15/813,097 | Nov. 14, 2017 | EPISTEMIC UNCERTAINTY REDUCTION USING SIMULATIONS, MODELS AND DATA EXCHANGE<br>which is a continuation-in-part of: |
| 15/616,427 | Jun. 7, 2017 | RAPID PREDICTIVE ANALYSIS OF VERY LARGE DATA SETS USING AN ACTOR- |

-continued

| Application No. | Date Filed | Title |
|---|---|---|
| Current application | Herewith | DRIVEN DISTRIBUTED COMPUTATIONAL GRAPH SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is also a continuation-in-part of: |
| 15/806,697 | Nov. 8, 2017 | MODELING MULTI-PERIL CATASTROPHE USING A DISTRIBUTED SIMULATION ENGINE |
| | | which is a continuation-in-part of: |
| 15/376,657 U.S. Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM |
| | | which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/806,697 | Nov. 8, 2017 | MODELING MULTI-PERIL CATASTROPHE USING A DISTRIBUTED SIMULATION ENGINE |
| | | which is a continuation-in-part of: |
| 15/343,209 | Nov. 4, 2016 | RISK QUANTIFICATION FOR INSURANCE PROCESS MANAGEMENT |

-continued

| Application No. | Date Filed | Title |
|---|---|---|
| | | EMPLOYING AN ADVANCED DECISION PLATFORM |
| | | which is a continuation-in-part of: |
| 15/237,625 U.S. Pat. No. 10,248,910 | Aug. 15, 2016 Issue Date Apr. 2, 2019 | DETECTION MITIGATION AND REMEDIATION OF CYBERATTACKS EMPLOYING AN ADVANCED CYBER-DECISION PLATFORM |
| | | and is also a continuation-in-part of: |
| 15/229,476 U.S. Pat. No. 10,454,791 | Aug. 5, 2016 Issue Date Oct. 22, 2019 | HIGHLY SCALABLE DISTRIBUTED CONNECTION INTERFACE FOR DATA CAPTURE FROM MULTIPLE NETWORK SERVICE SOURCES |
| | | which is a continuation-in-part of: |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/673,368 | Aug. 9, 2017 | AUTOMATED SELECTION AND PROCESSING OF FINANCIAL MODELS |
| | | which is a continuation-in-part of: |
| 15/376,657 U.S. Pat. No. 10,402,906 | Dec. 13, 2016 Issue Date Sep. 3, 2019 | QUANTIFICATION FOR INVESTMENT VEHICLE MANAGEMENT EMPLOYING AN ADVANCED DECISION PLATFORM |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION |

-continued

| Application No. | Date Filed | Title |
|---|---|---|
| | | MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,312 | Dec. 7, 2017 | SYSTEM AND METHODS FOR MULTI-LANGUAGE ABSTRACT MODEL CREATION FOR DIGITAL ENVIRONMENT SIMULATIONS |
| | | which is a continuation-in-part of: |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| Current application | Herewith | SYSTEM AND METHOD FOR CREATION AND IMPLEMENTATION OF DATA PROCESSING WORKFLOWS USING A DISTRIBUTED COMPUTATIONAL GRAPH |
| | | Is a continuation-in-part of: |
| 17/008,276 | Aug. 31, 2020 | PRIVILEGE ASSURANCE OF ENTERPRISE COMPUTER NETWORK ENVIRONMENTS |
| | | which is a continuation-in-part of: |
| 17/000,504 | Aug. 24, 2020 | ADVANCED DETECTION OF IDENTITY-BASED ATTACKS TO ASSURE IDENTITY FIDELITY IN INFORMATION TECHNOLOGY ENVIRONMENTS |
| | | which is a continuation-in-part of: |
| 16/412,340 | May 14, 2019 | SECURE POLICY-CONTROLLED PROCESSING AND AUDITING ON REGULATED DATA SETS |
| | | which is a continuation-in-part of: |
| 16/267,893 | Feb. 5, 2019 | SYSTEM AND METHODS FOR DETECTING AND CHARACTERIZING ELECTROMAGNETIC EMISSIONS |
| | | which is a continuation-in-part of: |
| 16/248,133 | Jan. 15, 2019 | SYSTEM AND METHOD FOR MULTI-MODEL GENERATIVE SIMULATION MODELING OF COMPLEX ADAPTIVE SYSTEMS |
| | | which is a continuation-in-part of: |
| 15/849,901 | Dec. 21, 2017 | SYSTEM AND METHOD FOR OPTIMIZATION AND LOAD BALANCING OF COMPUTER CLUSTERS |
| | | which is a continuation-in-part of: |
| 15/835,436 U.S. Pat. No. 10,572,828 | Dec. 7, 2017 Issue Date Feb. 25, 2020 | TRANSFER LEARNING AND DOMAIN ADAPTATION USING DISTRIBUTABLE DATA MODELS |
| | | which is a continuation-in-part of: |
| 15/790,457 | Oct. 23, 2017 | DISTRIBUTABLE MODEL WITH BIASES CONTAINED WITHIN DISTRIBUTED DATA |
| | | which claims benefit of, and priority to: |
| 62/568,298 | Oct. 4, 2017 | DISTRIBUTABLE MODEL WITH BIASES CONTAINED IN DISTRIBUTED DATA |
| | | and is also a continuation-in-part of: |
| 15/790,327 | Oct. 23, 2017 | DISTRIBUTABLE MODEL WITH DISTRIBUTED DATA |
| | | which claims benefit of, and priority to: |
| 62/568,291 | Oct. 4, 2017 | DISTRIBUTABLE MODEL WITH DISTRIBUTED DATA |
| | | and is also a continuation-in-part of: |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | and is also a continuation-in-part of: |
| 15/141,752 | Apr. 28, 2016 | SYSTEM FOR FULLY INTEGRATED CAPTURE, AND ANALYSIS OF BUSINESS INFORMATION RESULTING IN PREDICTIVE DECISION MAKING AND SIMULATION | the entire specification of each of which is incorporated herein by reference.

BACKGROUND OF THE INVENTION

Field of the Invention

This disclosure relates to the field of computer systems and data analysis, and more particularly the field of data processing workflow creation and orchestration.

Discussion of the State of the Art

The amount of data generated in the current age of technology is overwhelming. When properly analyzed and utilized, such data can be of tremendous value, particularly to businesses that can capitalize on the knowledge contained in the data. Processing large amounts of data to extract valuable information is not easy, and heretofore could only be done by data scientists or data analysts trained in the field. Individuals and businesses may be experts in some other domain that can benefit from data analyses but may not have the expertise in data analysis to extract the information they need from their data. These individuals and businesses may know what data they need and which tasks to perform on the data to generate the outcome they are seeking but may lack the knowledge required to process the data to achieve a specific outcome. In many cases, acquiring appropriate data processing knowledge may be too time-consuming and hiring knowledgeable personnel may be cost-prohibitive or unfeasible for other reasons such as required access to sensitive data or systems.

What is needed is a system and method that allows individuals and companies with little or no data processing knowledge to easily create and implement data processing workflows to process their data as desired without having to invest time or money into data processing expertise.

SUMMARY OF THE INVENTION

Accordingly, the inventor has developed and reduced to practice a system and method for creating and implementing data processing workflows using a distributed computational graph comprising modules that represent various stages within the workflow. Each module represents one or more data processing steps, with some of the modules representing data processing performed by a cloud-based service and containing code for interfacing with the application programming interface (API) of that cloud-based service. A series of modules and their interconnections specify the workflow. After creation of the workflow, data is processed according to the workflow by implementing the data processing steps represented by each module, some of which will access cloud-based data processing services. The result is that users can create complex data processing workflows that utilize cloud-based services and the event-driven application design pattern for stateful stream analysis to process data without having to know how to access the cloud-based data processing services, or even know that they exist. As cloud-based services are designed to be scalable, large volumes of data can be processed in this manner using the distributed computational graph with effectively unlimited computing resources.

According to a preferred embodiment, a system for creating and implementing data processing workflows using a distributed computational graph is disclosed, comprising: a computing device comprising a memory, a processor, and a non-volatile data storage device; a front end comprising a first plurality of programming instructions stored in the memory of, and operating on the processor of, the computing device, wherein the first plurality of programming instructions, when operating on the processor, cause the computing device to: provide a graphical user interface for creation of a distributed computational graph representing a data processing workflow, wherein: the graphical user interface comprises icons representing data processing modules and connections between the modules; the distributed computational graph comprises one or more of the data processing modules represented as nodes of the distributed computational graph and connections between the data processing modules represented as edges of the distributed computational graph; and one or more of the nodes of the distributed computational graph is a data processing module that contains code for accessing the API of a cloud-based data processing service; send the distributed computational graph to a system back end for implementation of the data processing workflow; and a system back end comprising a second plurality of programming instructions stored in the memory of, and operating on the processor of, the computing device, wherein the second plurality of programming instructions, when operating on the processor, cause the computing device to: receive the distributed computational graph; construct the data processing workflow from the distributed computational graph using an application programing interface that generates workflow code via representational state transfer calls; instantiate and validate the data processing workflow using the workflow code; prepare the data processing workflow for processing by initializing one or more of: software components, devices, cloud-based services; serialize the data processing workflow as a series of processing events; execute the processing events using a data processing engine.

According to another preferred embodiment, a method for creating data processing workflows using modules is disclosed, comprising the steps of: providing a graphical user interface for creation of a distributed computational graph representing a data processing workflow, wherein: the graphical user interface comprises icons representing data processing modules and connections between the modules; the distributed computational graph comprises one or more of the data processing modules represented as nodes of the distributed computational graph and connections between the data processing modules represented as edges of the distributed computational graph; and one or more of the nodes of the distributed computational graph is a data processing module that contains code for accessing the API of a cloud-based data processing service; constructing the data processing workflow from the distributed computational graph using an application programing interface that generates workflow code via representational state transfer calls; instantiating and validating the data processing workflow using the workflow code; preparing the data processing workflow for processing by initializing one or more of: software components, devices, cloud-based services; serializing the data processing workflow as a series of processing events; and executing the processing events using a data processing engine.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 9 is a block diagram illustrating an exemplary hardware architecture of a computing device used in various embodiments of the invention.

DETAILED DESCRIPTION

Figure 1:
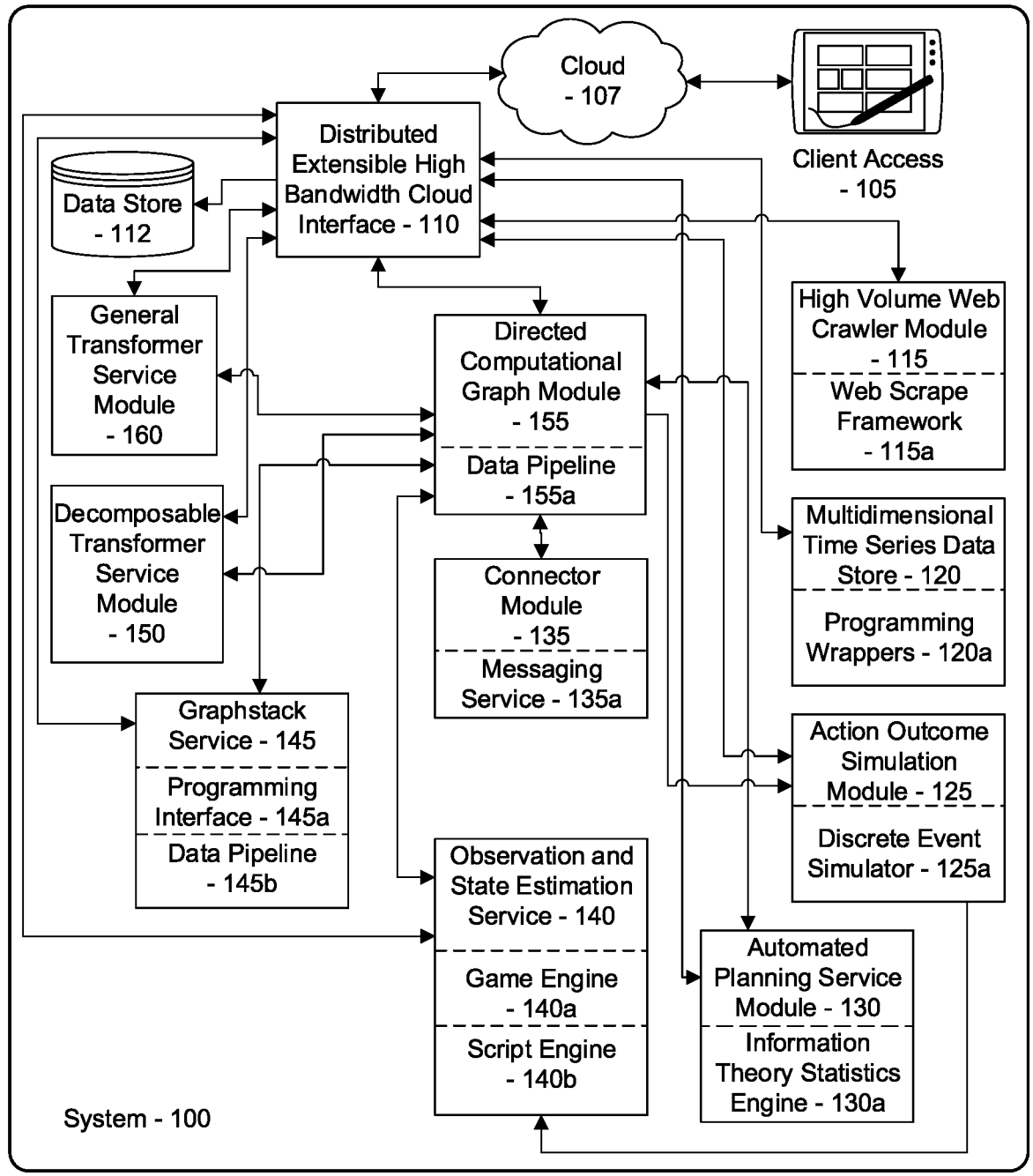
FIG. 1 is a block diagram of an exemplary system architecture for an advanced cyber decision platform.

Accordingly, the inventor has developed and reduced to practice a system and method for creating and implementing data processing workflows using a distributed computational graph comprising modules that represent various stages within the data processing workflow. Each module represents one or more data processing steps, with some of the modules representing data processing performed by a cloud-based service and containing code for interfacing with the application programming interface (API) of that cloud-based service. A series of modules and their interconnections specify the workflow. After creation of the workflow, data is processed according to the workflow by implementing the data processing steps represented by each module, some of which will access cloud-based data processing services. The result is that users can create complex data processing workflows that utilize cloud-based services to process data without having to know how to access the cloud-based data processing services, or even know that they exist. As cloud-based services are designed to be scalable, large volumes of data can be processed in this manner using the distributed computational graph with effectively unlimited computing resources. The distributed computational graph (DCG) has a user interface (UI) front end that allows users to easily create simple or complex data processing workflow specifications for processing various types of data. In some embodiments, the UI for the DCG is a graphical user interface (GUI) interface (also known as "drag and drop" or "click and drag") containing data processing modules displayed as graphic icons that can be chained together to form a workflow that takes the form of a directed graph of computations. While a GUI is not required, such an interface is of particular value to domain experts who have data that they would like to process and know how they would like the data processed, but lack the programming knowledge or knowledge of cloud-based data processing systems to process the data themselves. This method of workflow construction uses a declarative specification language (DSL) which allows new workflows to declaratively specify stages for workflows using pre-defined modules. The user, then, is able to create complex data processing workflows without needing any programming or detailed data processing knowledge. This makes the DCG system an incredibly useful and expressive data orchestration formalism for rapidly instantiating new data driven decision systems that rely on ingesting, normalizing, persisting, and finding insight from data. Details regarding the DSL are described below.

The data processing workflow is defined by a user defined, directed graph, each module of which can manipulate data and either forward the data or messages about the data to the next module(s) in sequence. Graph abstraction helps break the computation into components that are easily understood by the user. Processing of the data at any given stage may be completed in parallel threads or distributed tasks on different computing nodes to enhance performance. The workflow is represented as a sequence of data processing modules, some of which are associated with cloud-based services to process certain types of data, and some of which contain local or other data processing routines (for example, storage, transmission, reformatting, filtering, etc.). Each module that references a cloud-based service contains code for accessing the application programming interface (API) of the associated cloud-based service. The system seamlessly ties together local processing and processing by multiple cloud-based data processing services to allow very complex data processing without having to know how the data is processed as the we leverage an intuitive domain-specific language for declaratively specifying distributed workflows. As most cloud-based services are designed to be scalable by adding or accessing additional computing resources on an as-needed basis, workflows implemented by the system are almost infinitely horizontally scalable and can handle enormous amounts of data. This makes the system suitable for enterprise-level data processing.

According to an embodiment, the DCG backend is comprised of two main components, environmental orchestration and stream data processing. Orchestration is the automated configuration, coordination, and management of computer systems and software. The DCG leverages a plug-and-play style data processing backend and orchestrates work against that backend. The environmental orchestration encompasses the submission of new workflows, monitoring of active workflows, and generation of requests to third parties for resources to be allocated. Application programming interfaces (APIs) mediate orchestration tasks into data processing actions. A stream data processor prepares the workflow to be executed by the data processing engine by serializing the workflow and stages to facilitate the transfer of data. After the workflow has executed and the workflow process is complete, a workflow report may be generated containing the workflow results.

Using a GUI interface, users can build a directed computational graph by dragging-and-dropping modules that represent data processing steps or cloud-based services which can perform transformations or other processes on streaming data as it progresses through the workflow. For each module that is added to the workflow, an associated configuration window is displayed that prompts the user for stage (module) configuration attributes. These stage configuration attributes provide the requisite information for three important aspects of the system: the data context, the stage configuration within the workflow, and the API field information for the API associated with a cloud-based service module. The data context defines how data leaves one stage and is understood by the next stage. The stage configuration within the workflow may be handled by an API manager that receives parsed stage configuration attributes to create the workflow code using representational state transfer (REST) calls. The API field information is parsed from the stage configuration attributes and is used to populate the fields of an API so that the cloud-based service can be easily integrated into the data processing workflow and communicate with the stages it is connected to.

An example of a data processing workflow created by an embodiment of the system is a data processing workflow that creates a graph of incoming data, performs some analyses on the graph data, and then stores the graph data and analyses. Construction of the workflow begins by selecting a module and placing it in a workflow mapper space where the workflow topography can be tailored to fit the workflow needs of the user. A source stage is selected which provides the data to be processed, a sink stage to identify where to store the data, and multiple transformation stages to perform various data processing steps. The modules dropped into the workflow mapper have ports attached to them. These ports are for connecting each stage to another. Source and sink stages will generally have one port because a source stage provides data and a sink stage stores or stores data; no data transformations take place during a source or sink stage. Transformation stages will generally have two ports, one for input data or messages and one for output data or messages. An example of a first transformation stage is a module that utilizes the cloud-based service Elasticsearch to index the incoming data so that it can be organized and searched more efficiently. When the Elasticsearch service is selected, a stage configuration window appears and prompts for stage attributes. Upon completion of the first stage configuration the user selects the next transformation stage. In this example, the second transformation state is a module associated with JanusGraph service for creating a graph of the indexed data. Once both modules for the previously stated cloud-based services are dropped within the workflow mapper, the two modules can be connected and the direction of the connection specified by simply clicking on a port of one module and connecting it to a port on another module. In this example, the data moves from the Elasticsearch service to the JanusGraph service, so the output port of the Elasticsearch module is selected and connected to the input port of the JanusGraph module. This establishes the parent-child relationship between the two stages. It is possible to have the output port of one stage feed into the input ports of multiple stages (e.g. the output of a transformation stage is used by different services). Likewise, it is possible to have multiple outputs feed into the input port of single stage (e.g. multiple stages use the same sink stage for data storage).

Construction of the workflow continues by adding additional transformation stages. The next transformation stage is linked to the cloud-based service Apache TinkerPop™ which facilitates analysis of the graph data generated by the JanusGraph service. The stage is configured and subsequently, the cloud-based service connecting the JanusGraph module to the Apache TinkerPop™ module. Finally, the user selects the sink stage service that provides the persistence capabilities that satisfy the workflow use case of the system user. In this example the user selects the Apache Cassandra™ service for its scalability, availability, and its fault tolerance when handling large active data sets. The connection between the Apache TinkerPop™ and the Apache Cassandra™ modules are made, and the sink stage configuration completed. When the stages have all been configured, and the connections between the stages are completed, the workflow can be saved and executed to enable the data processing use case of the user.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

"Data processing step" or "data transformation" as used herein is a function performed on zero or more streams of input data which results in a single stream of output which may or may not then be used as input for another transformation. Data processing steps may comprise any combination of machine, human or machine-human interactions. Data processing steps need not change data that enters them, one example of this type of data processing step would be a storage data process step which would receive input and then act as a queue for that data for subsequent data processing steps. As implied above, a specific data processing step may generate output data in the absence of input data. A time stamp serves as an example. In an embodiment of the system, data processing steps are placed into workflows such that the output of one data processing step may serve as an input for another. These workflows can consist of two or more data processing steps with the number of data processing steps limited only by the resources of the system. Historically, data processing workflows have been linear with each data processing step in the workflow receiving input from one antecedent and providing output to one subsequent with no branching or iteration. Other workflows configurations are possible. The system is designed to permit complex workflow configurations including, but not limited to: linear, afferent branch, efferent branch, cyclical, and combinations of the above.

"Distributed computational graph" as used herein means a graph representing a data processing workflow comprising nodes (or vertices) representing data processing steps and edges representing transfer of data or messages between the nodes. Some or all of the nodes may be data processing modules comprising one or more data processing steps. Some of the modules may be modules configured to access cloud-based data processing services.

"Graph" as used herein is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB 08/13/1965" and "speaks English". Similar to the use of properties to further describe the information in a node, a relationship between two nodes that forms an edge can be qualified using a "label". Thus, given a second node "Thomas G," an edge between lames R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed."

"Workflow" or "data processing workflow" as used herein means an orchestrated pattern of data processing activities.

Conceptual Architecture

FIG. 1 is a block diagram of an advanced cyber decision platform. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™ CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized preprogrammed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120a for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155a to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2:
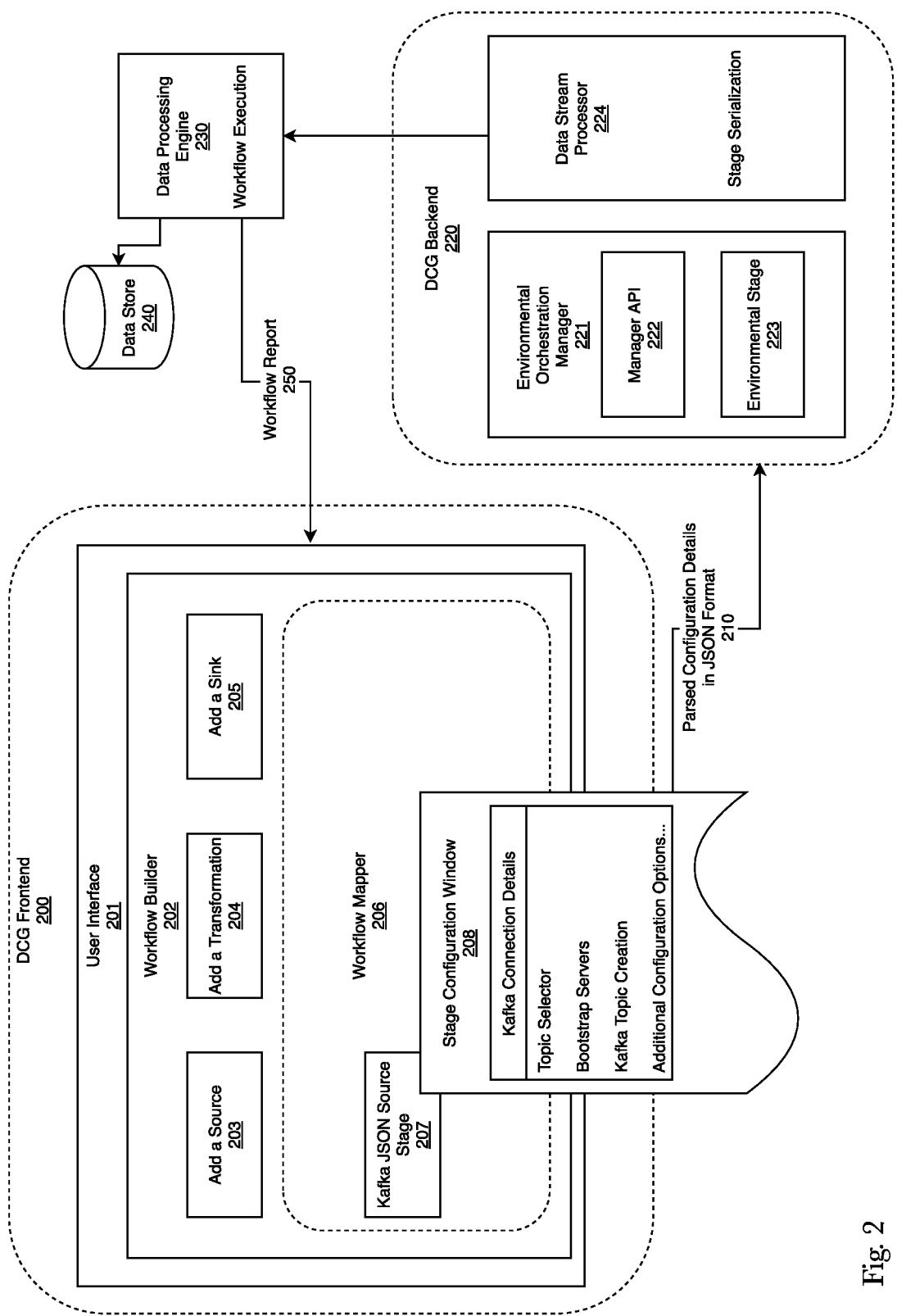
FIG. 2 is a diagram of an exemplary architecture for a system for creating data processing workflows using modules via a user interface and an orchestration and data processing backend.

FIG. 2 is a diagram of an exemplary architecture for a system for creating data processing workflows using modules via a user interface and an environmental orchestration and data processing backend. The system has a frontend 200 that allows a user to create a data processing workflow via a user interface (UI) 201. A workflow is a series of sequential data processing steps that are carried out based on user defined rules of conditions to execute a process. A workflow is constructed as a series of stages (typically represented by data processing modules). Within the UI 201 is a workflow builder 202 which contains drag-and-drop modules 203, 204, 205 and a workflow mapper 206 which is a space where the modules can be arranged and connected to form a data processing workflow.

Each module represents a stage in the workflow. A stage performs one or more data processing steps, and then forwards the data or a message about the data to the next stage. In this embodiment, there are three types of stages the user may select from: source stage, sink stage, and transformation stage. A source stage identifies where the data to be processed comes from. The transformation stage identifies the data processing step or steps that may transform the data or message. A sink stage identifies where the processed data is being stored. Each module corresponds to one or more data processing steps or to a cloud-based service that is responsible for executing the data processing steps described by the stage. Stage libraries comprising predefined stages may be provided that allow users to search for the correct module or modules that suit their use case needs. In an embodiment, the system allows the specification of other named stages that can be added to the stage libraries. Each module that utilizes a cloud-based data processing service contains customized code for accessing the application programming interface (API) of a cloud-based service to process certain types of data. The API facilitates interactions and communication between modules and cloud-based services in order for the workflow to be executed. As data is received at each stage, the API is checked to see what the formatting requirements are for that cloud-based service, and the data is formatted into the appropriate format as required by the API (e.g., a JavaScript Object Notation (JSON) file with the fields specified by the API). The module submits the data to the API in the appropriate format and waits for the cloud-based service to send back processed data via the API.

In an embodiment, creation of workflows begins by clicking on any of the add a source 103, add a transformation 204, or add a sink 205 modules. When a module is selected, a dropdown window appears that allows the user to specify what type of module he or she wishes to create. For example, when the add a source 203 module is selected, a list of source stages is displayed including, but not limited to, a Kafka JSON source stage, Kafka string source stage, database source stage, multi-dimensional time series database source stage, RabbitMQ™ source stage, cron string scheduled source stage, cron JSON scheduled source stage, and simple storage service source (S3) stage. The desired source stage is selected and drag-and-dropped into the workflow mapper 206. The workflow mapper 206 is a space where the modules can be arranged and connected (between inputs and outputs) to form a directed graph that represents the workflow to be executed. A workflow will be created to carry out the data processing stages specified during workflow creation. When a module is dropped within the workflow mapper 206, a stage configuration window 208 is displayed to prompt for stage connection details which define and format the stage to suit the use case and to enable the data processing step associated with that stage. For example, if a Kafka JSON source stage 207 is chosen and dropped into the workflow mapper, the stage configuration window 208 will prompt for Kafka stage connection details such as topic selector, partition factor, partition count, etc. Once a workflow has been fully created and configured it is stored to a workflow database for future use. The stage configuration details defined by the creator of the workflow are parsed and put into JSON format 210 before being sent to the distributed computational graph (DCG) backend 220.

In an embodiment, the DCG backend 220 is a representational state transfer (RESTful) service in that it provides interoperability between computer systems on the internet by conforming to a REST architectural style that uses hypertext transfer protocol (HTTP) requests to manipulate data. The distributed computational graph backend 220 is where the environmental orchestration 221 occurs. The environmental orchestration manager (EOM) 221 receives the parsed stage configuration details in JSON format 210. Within the EOM 221 is a customized manager API 222 that receives the JSON formatted configurations and constructs a data processing workflow from the JSON configurations by using REST commands (GET, POST, PUT, DELETE) to generate the coded structure of the workflow. While constructing the workflow, the manager API 222 is capable of checking whether the specified workflow is valid or invalid. An example of an invalid workflow is a workflow that does not contain a source stage or environmental stage. The manager API 222 generates messages to communicate if a workflow is invalid, has been constructed, is ready, saved, or deleted.

The EOM 221 generates special environmental stages 223 that function to set up the environment needed for the workflow to execute properly. An environment encompasses but is not limited to all modules, data processes, software, hardware, and computing resources that are required to enable the workflow. Each module has inherent pre and post conditions that specify what the module needs to be able to operate. The module pre and post conditions are sent to the EOM 221 via the parsed configuration details 210. The environmental stage 223 contains all of the module pre and post conditions and performs the actions necessary to satisfy the conditions. An environmental stage 223 may be executed before the workflow to initialize any devices and sensors, to request any third party resources that the workflow may need, and remove any data artifacts that may exist within the stages of a previously used workflow.

The data stream processor 224 is responsible for workflow and stage serialization. Serialization occurs to take the stage object state, which was created when the manager API 222 generated the workflow code from the JSON configuration, and convert it to binary format for data transmission, processing, and storage. The serialized workflow and stages are sent to a data processing engine 230 for workflow execution. The data processing engine takes the serialized data processing workflow code, abstracts the internal logic, either simple or complex, and processes the streaming data in an optimized way. Upon completion of the workflow, the results of which are stored to a data store 240, and a workflow report 250 displays the results back to the user via the user interface 201. Apache Beam™ is an example of one possible data stream processor that could be used to serialize the workflow and stages.

Figure 3:
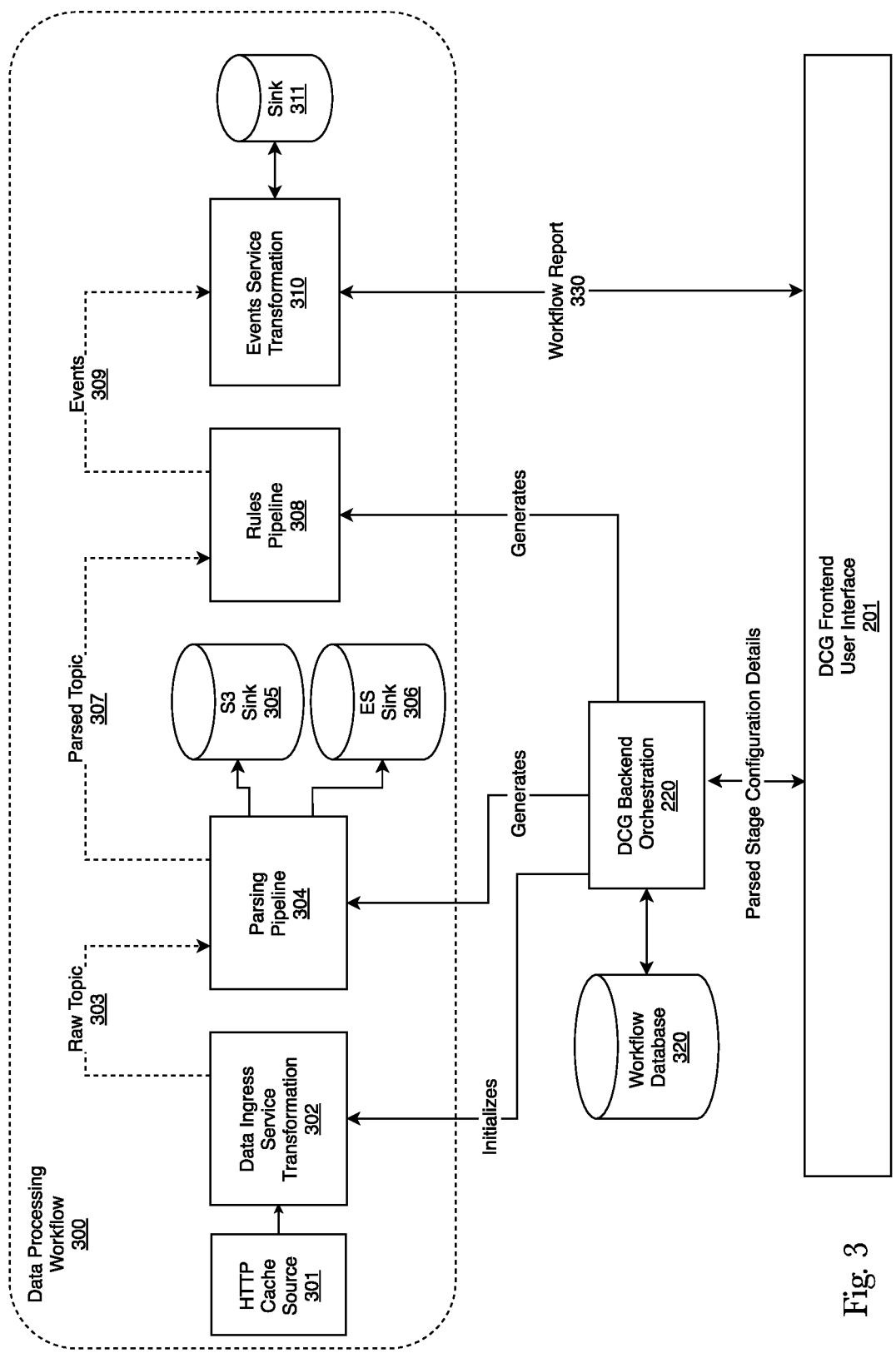
FIG. 3 is a diagram of an exemplary implementation of a data processing workflow.

FIG. 3 is a diagram of an exemplary data processing workflow 300. A data processing workflow may be created via a DCG frontend user interface 201 by drag-and-dropping data processing modules to assign the workflow tasks. The stage configuration details are parsed into JSON format and sent to the DCG backend orchestration 220.

The DCG backend 220 constructs the workflow by converting the JSON configuration into code via REST calls to the manager API 222, FIG. 2, sets up the environment, and serializes the data. The workflow database 320 is a storage device that stores valid workflows and workflow states so that workflows can be stopped mid-execution and resume executing when accessed again. The DCG backend 220 creates an environmental stage, executed prior to starting the workflow, that initializes any devices, cloud-based services, and requests resources from third parties to enable the workflow to function properly. In this example, part of the environmental setup for this data processing workflow 300 was to initialize a data ingress service transformation 302 stage. Once the environment has been fully set up, the data processing workflow 300 can begin processing data. There is an HTTP cache source 301 stage that contains HTTP requests to a network. The data ingress service transformation 302 stage routes the HTTP requests by raw topic 303. The raw topic 303 represents the data context that is passed between the data ingress service transformation 302 stage and the parsing pipeline 304 stage. A data context is a rich object, semi-structured schema specification for how data leaves one stage and is understood by the next. The data context informs the next stage what type of data is incoming and what to do with it. These data contexts are defined by the stage configuration details during workflow creation using the user interface 201. The data context dictates that the data ingress service 302 outputs data in raw topic 303 form and that the parsing pipeline 304 transformation stage receives data in raw topic 303 form.

The parsing pipeline 304 is a transformation stage that takes raw topic input (e.g., raw Kafka topics) and outputs a parsed topic 307 data context. The parsing pipeline 304 sends its output to multiple child stages including two separate sink stages, 305, 306, and a rules pipeline 308 transformation stage for further processing. The rules transformation 308 stage receives a parsed topic 307 and categorizes the parsed topic into an event based on the rules located within that transformation service stage. The rules pipeline 308 transformation stage outputs events 309 which are received by an event service 310 which views each incoming event, stores the event to relational database sink 311 for future use, and displays the event details via a workflow report 330 back to the system user via the DCG frontend user interface 201. Events are then processed by a data processing engine (e.g., Flink) to execute the data processing specified by the event.

Figure 4:
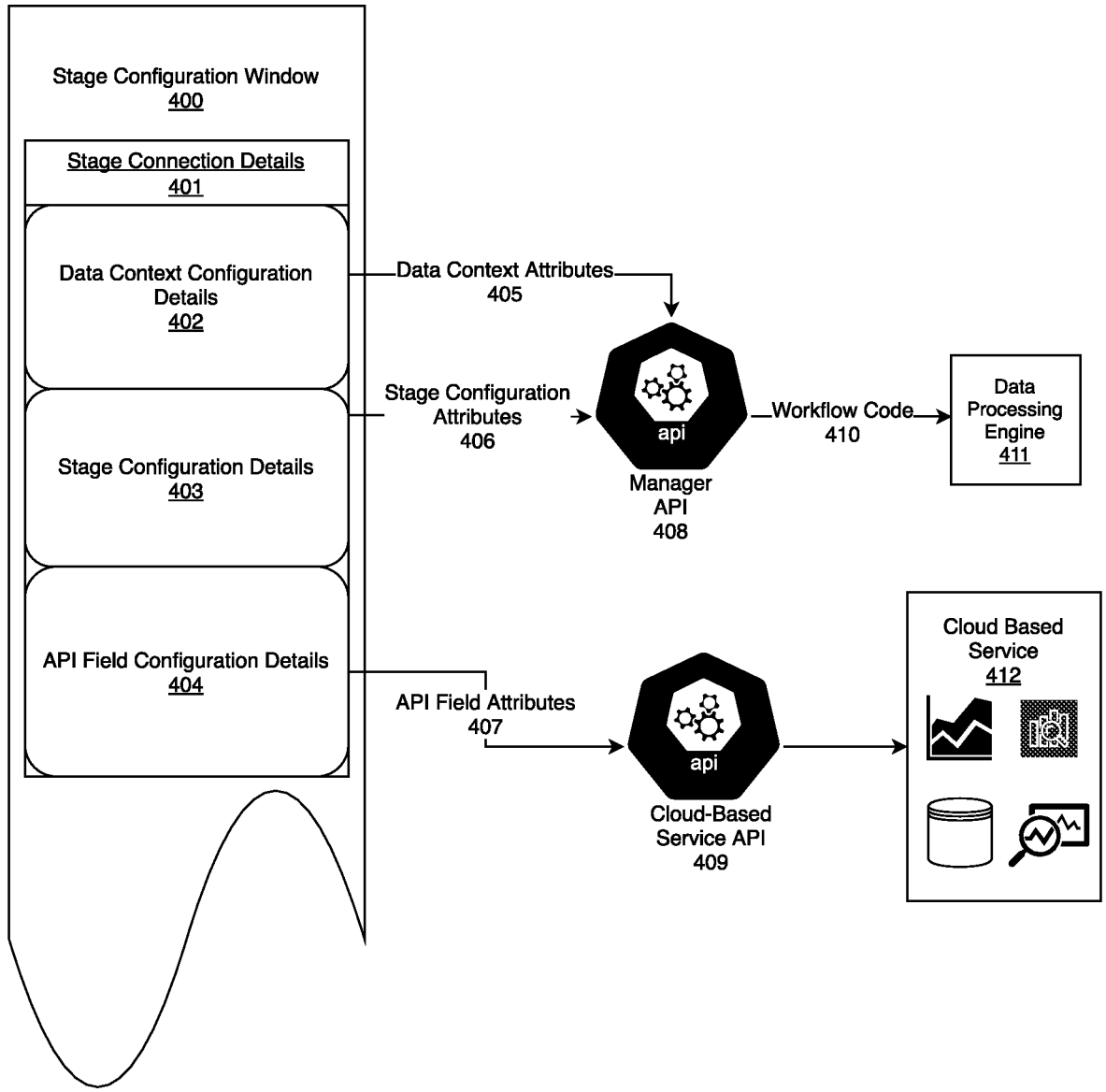
FIG. 4 is a diagram illustrating an exemplary use of stage configuration details to generate workflow code to execute the data processing workflow.

FIG. 4 is a diagram illustrating an exemplary use of stage configuration details to generate workflow code to execute the data processing workflow, according to an embodiment of the system. When a module is placed into the workflow mapper 106, FIG. 1, a stage configuration window 400 pops up asking for stage connection details 401. The content of the stage connection details 401 is customized for each cloud-based service. In an embodiment, the stage configuration details 401 information can be input via dropdown lists of pre-loaded detail options that are commonly used, typed responses to prompts, and various other techniques for inputting information. Providing all the information for the stage connection details 401 via the stage configuration window 400, facilitates the generation of the data context configuration details 402, the stage configuration details 403, and the API field configuration details 404. The configuration details 402, 403, 404 are then parsed and put into JSON format to extract the data context attributes 405, the stage configuration attributes 406, and the API field attributes 407. The data context attributes 405 define how data leaves one stage and is understood by the next stage. The stage configuration attributes 406 are the properties of each stage and used to define how the stages are interconnected. For example, the stage configuration attributes 406 may include parent-child relationships between stages, the type of stage (i.e. source, transformation, sink), routing rules, etc. Both the data context attributes 405 and the stage configuration attributes 406 are sent to a manager API 408. The manager API 408 uses the incoming parsed attributes in JSON format to validate and generate the workflow code 410 using REST calls such as GET, POST, PUT, and DELETE. Once the workflow code 410 has been validated and generated it can be serialized and sent to a data processing engine 411 to execute the data processing workflow.

The API field attributes 407 are used to populate the fields of a cloud-based service API 409 to integrate the cloud-based service into the data processing workflow of the user constructed data processing workflow. The content of the stage connection details 401 are customized in order to provide the correct, required cloud-based service API 409 field information as stipulated by the API documentation. This system allows the user to access cloud-based services 412 via the cloud-based service API 409 without requiring an extensive technological or programming background. The user simply has to fill out the stage configuration details 401 when the stage configuration window 400 pops up. The system automatically parses the configuration details 402, 403, 404, creates the workflow code 410, serializes the workflow, and executes the workflow.

Figure 7:
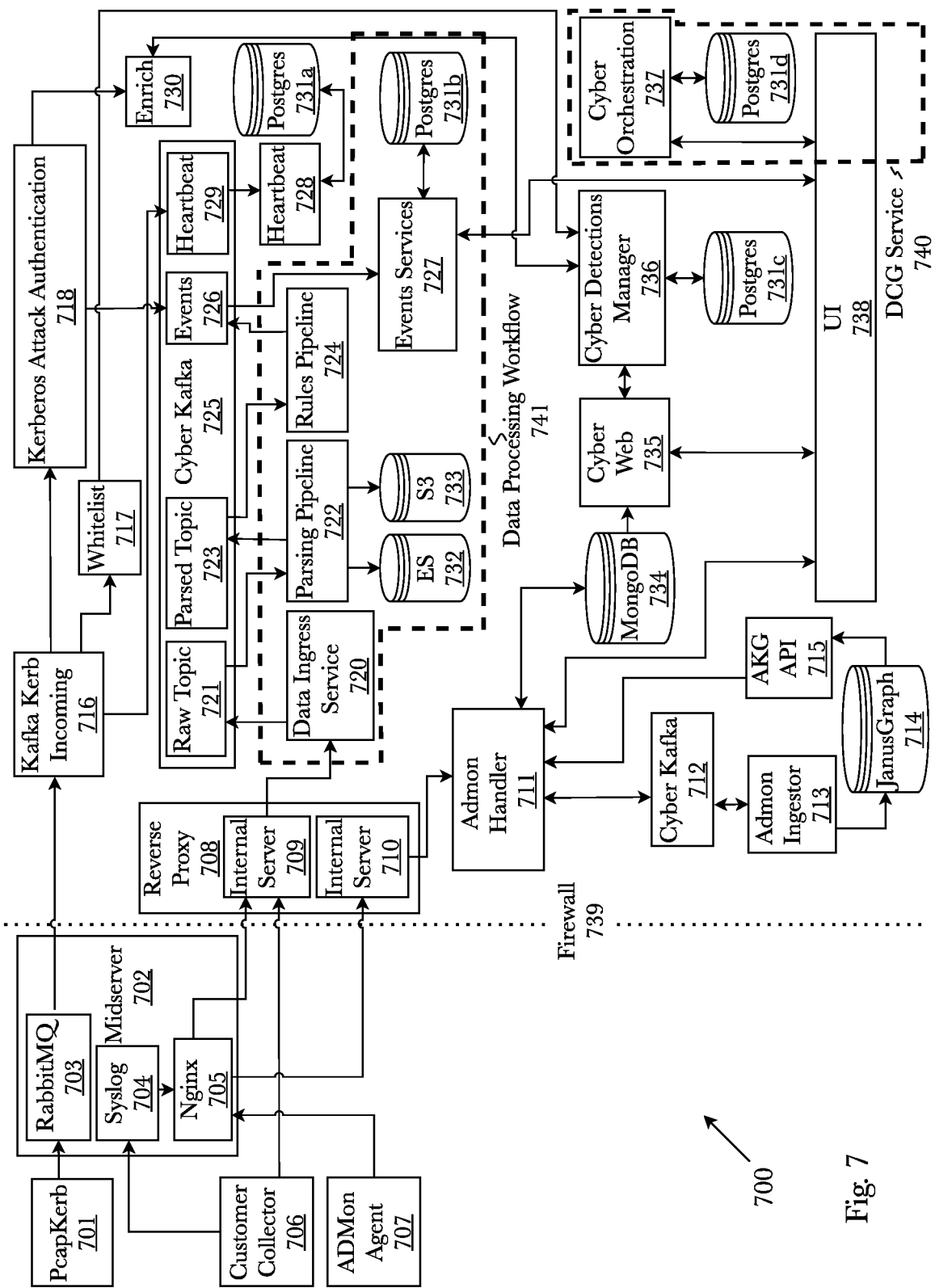
FIG. 7 is block diagram of an exemplary system architecture for a cybersecurity implementation of an advanced cyber decision platform utilizing a distributed computational graph data processing workflow.

FIG. 7 is block diagram of an exemplary system architecture for a cybersecurity implementation of an advanced cyber decision platform utilizing a distributed computational graph data processing workflow. In this example, the advanced cyber decision platform 700 is configured to detect and defend against Kerberos authentication cyber-attacks. The system is segmented by a firewall 739 that differentiates the left hand client side from the right hand host side. Located on the client side of the firewall 739 is a midserver 702 that can optimize the ingestion of data into cloud-based service(s) by transforming the data prior to forwarding upstream. Midserver 702 runs a plurality of containerized services that serve to collect, aggregate, analyze, transform, compress, and securely transmit data. These containerized services can be roughly categorized in four ways: traffic processors, sensors, management services, and utilities. Containers used as traffic processors are primarily used to receive forwarded traffic from a customer network via a customer collector agent 706, transform the traffic if necessary, and then forward the traffic upstream over the primary connection. Examples of traffic processors are system log containers 704 and reverse proxy containers such as Nginx service 705. Additionally, the midserver 702 also provides message shaping and enrichment such as adding additional contextual fields to log sources as needed. An example of a messaging containerized service is RabbitMQ 703 which acts as a proxy for advanced message queuing protocol (AMQP) messages using the Shovel plugin. The service is primarily used for queuing and forwarding of traffic generated by messaging agents. A plurality of software agents may monitor an organizations network, including but not limited to a Kerberos messaging capture agent (PcapKerb) 701, active directory monitoring (ADMon) agents 707, and the customer collector agent 706 as referred to above. Detailed information about midserver 702 is contained in U.S. patent application Ser. No. 16/412,340.

The midserver 702 messaging container service RabbitMQ 703 forwards Kafka Kerberos topics 716 which are scanned to identify the ticket status of the incoming connection request. If the ticket status is identified as being part of the whitelist 717 which is a list of explicitly identified entities that have access to a particular privilege, service, mobility, or recognition. Kafka Kerberos topics 716 that are approved via the whitelist 717 are forwarded to a cyber detections manager 736 for further processing. Non-whitelisted Kafka Kerberos topics 716 are sent for Kerberos attack authentication 718 where the ticket contained within the Kafka Kerberos topic 716 can be categorized into types of Kerberos attacks. Some examples of the types of attacks are: golden ticket, silver ticket, pass-the-ticket, pass-the-hash, and overpass-the-hash. Categorized Kerberos attacks are then cross referenced against a plurality of cyber enrichment 730 databases that contain information about various cyber-security related events such as: known threat actors, captured metadata associated with both offensive and defensive security and software tools, and breach content which allows for matching of emails and domains to breach records. The categorized Kerberos attacks are enriched 730 which provides more context and potentially more data about the attack. The enriched data is forwarded to a cyber detections manager 736 for further processing.

Kafka Kerberos topics 716 may also be sent to the cyber Kafka 725 messaging service which creates a heartbeat topic 729 that can be sent to a heartbeat service 728. A heartbeat is a periodic signal generated by hardware or software to indicate normal operation and to synchronize other parts of a computer system. A heartbeat service 728 monitors heartbeat behavior and logs any disruptions of service which may occur due to the incoming Kafka Kerberos topic 716 into a postgres relational data base 731a.

The cyber detections manager 736 aggregates, categorizes, and relays recent activity regarding detected ticketed access, both allowed and malicious, to network resources. A postgres relational database 731c is used by the cyber detections manager 736 persist recent detection data and to serve as an index for categorizing the cyber detections. The cyber detections manager 736 displays cyber detection reports that log the type of detection, when it happened, an associated IP address, and resources that may be affected. The cyber detection reports may be viewed by accessing a cyber web interface 725 via the UI 738.

The midserver 702 sends ingested, transformed data to a reverse proxy 708 which may mask the external-facing properties of an internal server 709 of a cloud-based service. A reverse proxy 708 may forward relevant data, or all data, received from the midserver 702, to an internal server(s) 709, 710 which may utilize a load balancer to process data efficiently and effectively. Referring to FIG. 7, there are separate internal servers 709, 710 that correspond to two separate cloud-based services, ADMon handler service 711 and data ingress service 727.

Data from internal server 710 may be sent to an active directory monitor (ADMon) handler 711 which is a REST service that receives and parses server requests into JSON format requests, validates the JSON requests, sends the validated JSON request documentation to a general purpose distributed database such as MongoDB 734 to persist status log records for batched or streaming data, and sends the validated JSON request to messaging service such as Kafka, to create a cyber Kafka 712 topic for the JSON request. The ADMon handler 711 also receives graph service analysis data via a custom analytic knowledge graph (AKG) API 715 which is stored to MongoDB 734. The ADMon handler 711 may use the graph analysis data to generate an ADMon report which may be sent to a user interface (UI) 738. The cyber Kafka topic 712 is fed into active directory monitoring (ADMon) ingestor service 713 which reads an incoming Kafka topic, parses the topic into vertices and edges, assigns a graph identifier such as a name, numeric ID, hash, etc., and creates a bulk request to be sent to a graph service. The ADMon ingestor service 713 sends a bulk request to a graph service such as JanusGraph 714 which is a cloud-based distributed graph database optimized for storing and querying graphs containing massive amounts of data. This makes JanusGraph service 714 a logical choice for exploring hidden relationships and interdependencies within active directory (AD) to expose true relationships and authorities. This helps uncover complex attack paths that would be readily exploited by attackers, but are only visible when viewing graphs of AD rather than lists of privileges.

Data from internal server 709 is to be used as the source stage of data processing workflow which is user defined using a DCG frontend contained within UI 738. The workflow may be constructed drag-and-drop modules that represent a data processing step or a cloud-based service. A workflow may consist of a source stage, one or more of a plurality of transformation stages, a sink stage, and an environmental stage which is a special stage created by the DCG backend. The DCG backend is represented as the cyber orchestrator 737 since this diagram illustrates a an advanced cyber detection platform 700 configured for Kerberos authentication cybersecurity detection and defense. The workflow in this case takes internal server 709 data, which is client network data that is collected via customer collector agents 706 and may be transformed by the midserver 702, and categorizes the data into events so that an event service 727 may process the event based upon its categorization. The workflow stages are represented on the diagram as data ingress service 720, parsing pipeline 722, a database 732 (for example, an ElasticSearch-based database), rules pipeline 724, and a cloud-based event service 727. The sink stages within the data processing workflow 741 are the simple storage service (e.g. Amazon's S3 cloud-based storage bins) 733 and Postgres relational database 731b.

To help facilitate a data processing workflow the DCG service 740 leverages an event streaming messaging service such as Kafka. The cyber Kafka 725 service creates topics of various types 721, 723, 725, 726, 729 that allow the stages, and the data processing steps or cloud-based services that the stages represent, to read, write, and process streams of events in parallel, at scale, and in a fault-tolerant manner even in the case of network problems or machine failures.

The data ingress service 720 filters incoming internal server 709 data packets to ensure that incoming packets are actually from networks from which they claim to originate. This provides a countermeasure against various spoofing attacks such as denial-of-service attack. The data ingress service 720 outputs verified data packets which are sent to the cyber Kafka 725 where they are placed into raw topic 721 message which can communicate with the parsing pipeline 722. The parsing pipeline 722 is generated by the DCG system 740 via the cyber orchestration 737 DCG backend. When the workflow was being constructed via the DCG system UI 738, two of the transformation stages selected are implemented as pipelines within the encompassing data processing workflow 741: one pipeline to parse the streaming data, and another to categorize the parsed streaming data into events. The postgres relational database 731d is used to persist saved workflows and to store pipelines that perform common data processing steps, such as data parsing, which can be instantiated by the DCG backend (cyber orchestration 737) to facilitate workflow execution. All stage configuration details are sent to the DCG service 740 backend for cyber orchestration 737 where the parsing and rules stages are actualized as pipelines. The parsing pipeline uses the ES service 732 to provide an index that can be cross-referenced to assist in parsing the raw data. Parsed topics are stored to an S3 database 733. Data exits the parsing pipeline and goes to cyber Kafka 725 where it is put into parsed topic 723 messages which can communicate with a rules pipeline 724 which contains rules and heuristics for categorizing parsed topics 723 into cyber events. Categorized event data is sent to Cyber Kafka 725 where it is put into event topic 726 messages which can communicate with an event service 727. An event service 727 receives event topics 726 and performs some sort of analysis or data process on the streaming data. Event service 727 activity results are stored to a postgres relational database 731b and a workflow report is generated detailing the event service 727 activity results which may be sent to the DCG service 740 frontend via the UI 738.

The workflow is constructed via the DCG frontend (UI 738) and the stage configuration details that specify the workflow are sent to the DCG backend (cyber orchestration 737) that initializes the environment necessary for the workflow to exist, workflow code is created and serialized, and workflow status can be monitored. The cyber orchestration creates the data processing workflow 741 to execute a cyber workflow use-case within the advanced cyber detection platform 700.

Detailed Description of Exemplary Aspects

Figure 5:
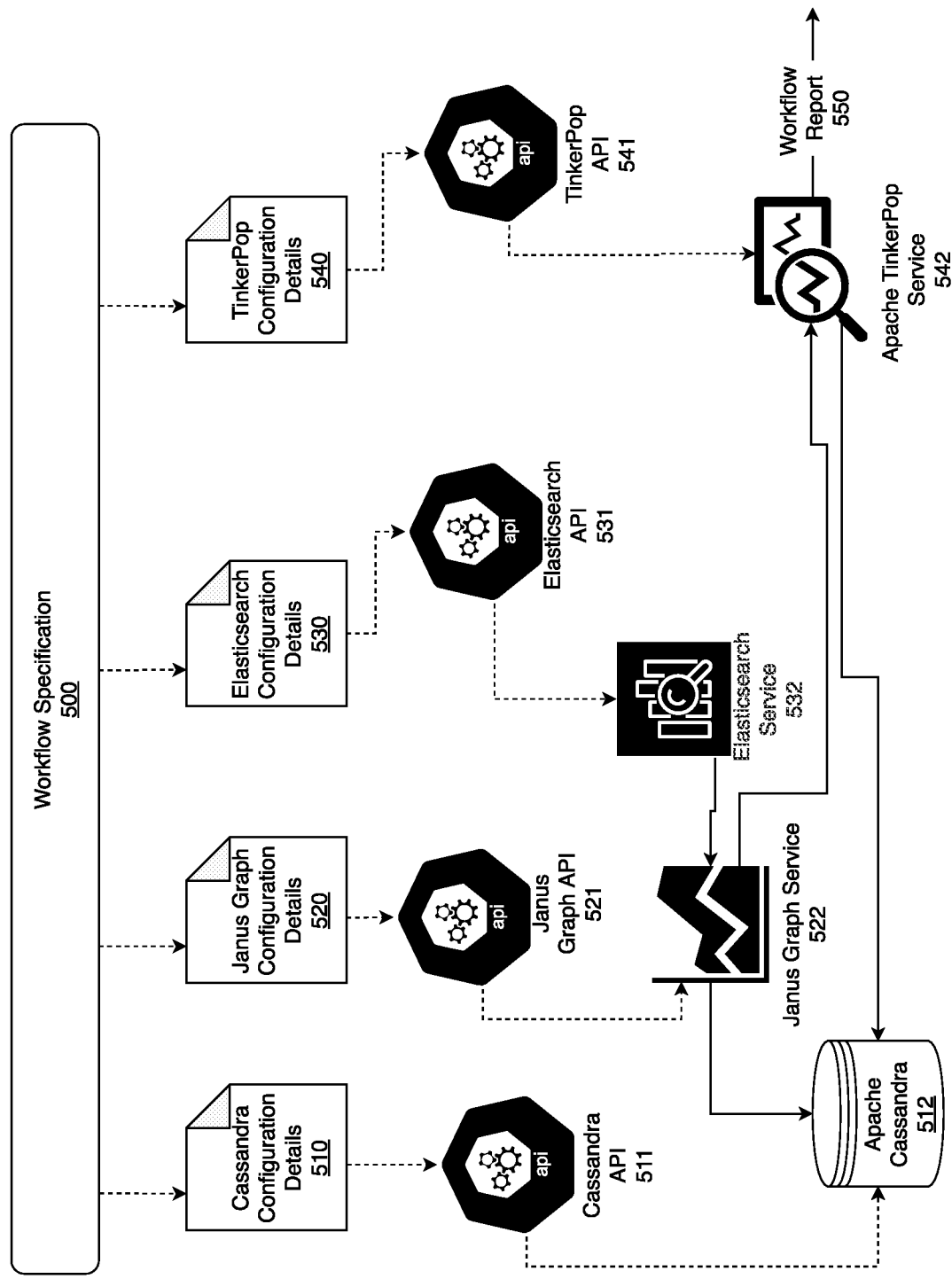
FIG. 5 is a diagram of an exemplary method for processing data using a user generated workflow specification.

FIG. 5 is a diagram of an exemplary method for processing data using a user generated workflow specification. A domain expert who wishes to create a data processing workflow can use the workflow mapper 206, FIG. 2, to construct a data processing workflow that will satisfy a use case. The constructed workflow, comprised of stages built from drag-and-drop modules and the selected stage configuration details, represent a complete workflow specification 500. Each stage represents a vertex on the distributed computational graph. The stage configuration attributes for each stage are used to define the data contexts which are passed between stages of the workflow. The data contexts represent the edges of distributed computational graph and define how data leaves one stage and is understood by the next stage. This ensures that as data is being processed through the workflow and passed from stage to stage that the input to a stage is in the correct format. Included in the workflow specification 500 are the stage configuration details 510, 520, 530, 540 which are parsed into JSON format so that the associated stage cloud-based service API 511, 521, 531, 541 fields can be populated with the correct data to enable the cloud-based service to perform its data processing task. As one embodiment of the invention, a data interchange language (e.g. Avro) using dynamically generated code and Remote Procedure Calls encodes this shared context and optionally facilitates data exchange across workflow stages.

The following example illustrates how data processing is the system may be used to create a simple workflow for graphing incoming data, analyzing the graph to interpret the data, and then storing the data. A workflow is built by dragging and dropping the modules for each stage. In this example, the drag-and-drop modules selected correspond to an Elasticsearch service 532 source stage that provides indexed data, the Janus Graph service 522 to graph the indexed data, the Apache TinkerPop™ service 542 to perform graph analyses on the graphed data, and the Apache Cassandra™ service 512 to persist the data. When a module is placed within the workflow mapper 206, FIG. 1, a configuration window pops up that allows the user to specify various configuration details which fully define the stage and the data context between linked stages. Contained within the workflow specification are the stage configuration details for each cloud-based service that is part of the workflow. The Cassandra configuration details 510 are parsed into JSON format so that the Cassandra API 511 fields can be populated with the JSON format configuration attributes. When all cloud-based service API 511, 521, 531, 541 fields have been populated, then the cloud-based services are ready to begin their data processing workflow tasks.

Indexed data is retrieved from the Elasticsearch service 532 via the Elasticsearch API 531. The retrieved indexed data is forwarded to the Janus Graph service 522 where large amounts of indexed data can be graphed to provide a visual representation of the indexed data. The graph generated by the Janus Graph service 522 is stored to the Apache Cassandra™ service 512. The Apache TinkerPop™ service 542 performs various graph analyses on the graph data provided by the Janus Graph service 522. The graph analyses results are stored to the Apache Cassandra™ service 512. The workflow has been fully executed upon completion of the graph analyses, and a workflow report 550 of the graph analyses results is generated and made available for review.

Figure 6:
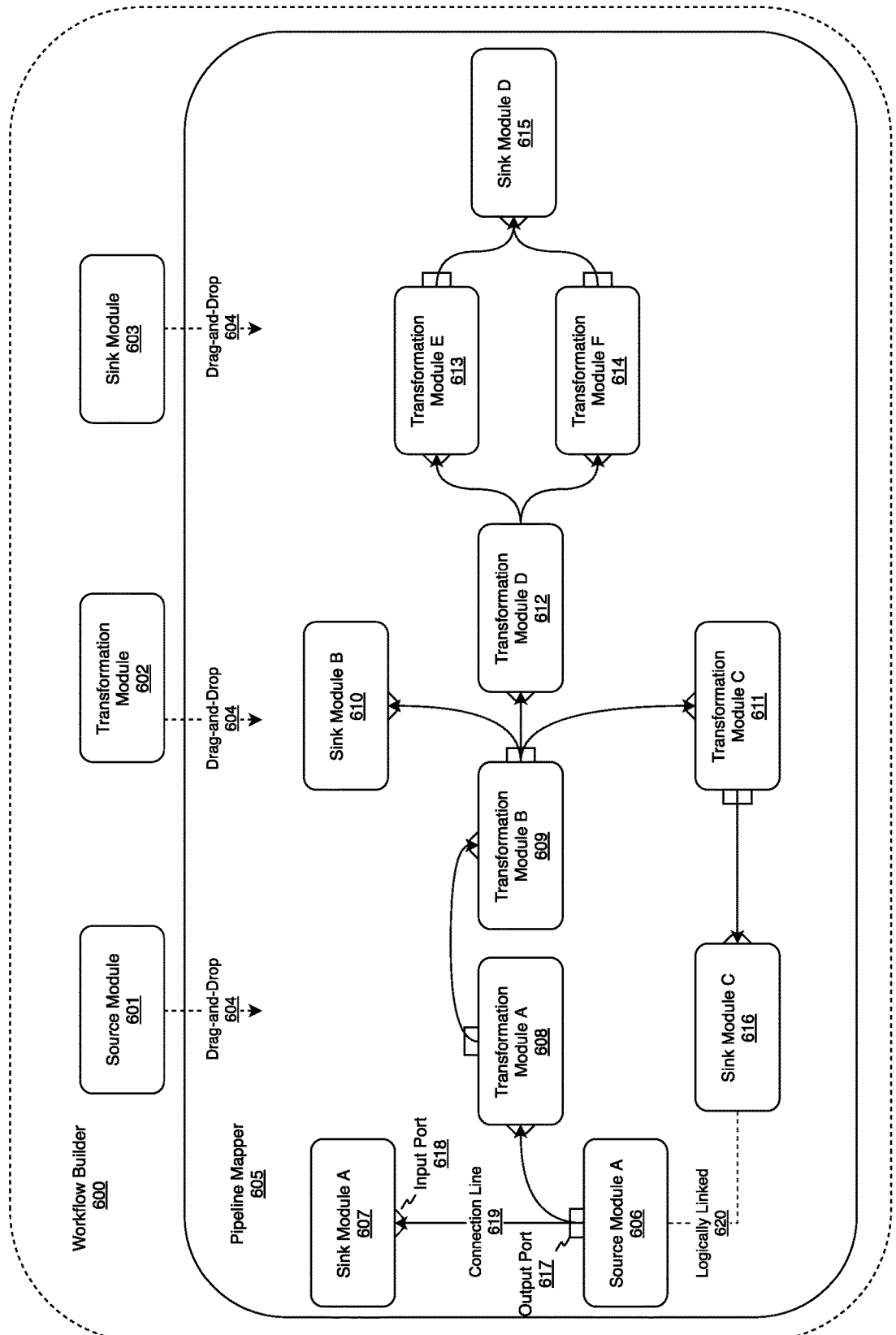
FIG. 6 is an exemplary diagram illustrating how modules are connected together to form a data processing workflow.

FIG. 6 is an exemplary diagram illustrating how modules are connected together to form a data processing workflow, according to an embodiment of the system. In a preferred embodiment, the system frontend leverages a workflow builder 600 which contains selectable source module 601, transformation module 602, sink module 603 and a workflow mapper 605 space for designing the workflow topography that will satisfy the workflow use case. The selectable modules 601, 602, 603 may be placed into and arranged within the workflow mapper 605 via drag-and-drop 604 manipulations.

The source module 601 is the starting point for a workflow because it provides the streaming data to be processed, however, the modules may be dropped into the workflow mapper 605 in any order (e.g. transformation, sink, then source). A data processing workflow consists of a source module 601 defining where the data comes from, sink module(s) 603 to identify where to put the processed data, and one or more of a plurality of transformation modules 602 to process the data. When dropped into the workflow mapper 605 the modules have ports attached to them. These ports are for connecting each module to another module. Source and sink modules in this embodiment have only one port because the source module 601 only provides data and a sink module 603 only stores data; as a general rule, no transformations take place during a source or sink stage, so only one input port 618 on sink modules 603 or an output port 617 on source modules is required. In this diagram, input ports 618 are curved in shape and output ports 617 are rectangular in shape. The shape of the ports shown within the diagram were chosen only to easily distinguish the input and output ports from one another in this illustrative example, and do not limit the implementation of the ports to the shapes described above. In other embodiments, the input and output ports may be differentiated with alternate shapes, color schemes, labels, etc. Transformation modules 602 will generally have two ports, an input port 618 to receive data or messages and output port 617 to forward data or messages related to processing of the data.

In a preferred embodiment, connections are made between modules by clicking on the output port 617 of a module, which spawns a connection line 619 with an arrow indicating the direction (output to input) that the data or messages are being sent. The connection line 619 can be connected to any module with an input port 618. Multiple connection lines 619 may flow into a single input port 618 of a module. Multiple connections being made to a single input port 618 is referred to as a multiple parent-child relationship between modules. An example of a multiple parent-child relationship would be multiple modules persisting data to a common sink module as demonstrated by transformation module E 613 and transformation module F 614 both connecting to sink module D 615. Modules 613 and 614 are the parent modules for the child sink module D 615. Additionally, multiple connection lines 619 may flow out of a single output port 617 of a module. Multiple connections coming out of single output port 617 is referred to as a multiple child-parent relationship between modules. An example of a multiple child-parent relationship would be a module that performs some process on the data, and then multiple different modules use the processed data to perform various data processing steps. This type of relationship is demonstrated between transformation module B 609 and its connections to sink module B 610, transformation module D 612, and transformation module C 611. Module 609 is the parent module, and modules 610, 611, 612 are the multiple child modules of the parent module 609. Additionally, cyclical streaming processes may be constructed using a sink and source module that are logically connected 620. An example of logically connected source and sink modules would be a source module 601 that uses Kafka topics to supply the incoming data, and a sink module 603 that stores its data or messages as Kafka topics. The data supplied and the data stored adhere to the same formatting schema (Kafka topics) and are logically linked via the schema. This allows for non-linear, cyclical streaming process to be carried out within the context of a workflow. An example of a cyclical streaming process is shown between the connections of source module A 606, transformation modules A 608, B 609, C 611 and sink module C 616 which is logically linked to source module A 606, thus forming a cyclical route for data to be processed. By arranging the modules and routing the interconnections between modules, a data processing workflow is created that will be implemented by the backend of the system. This method of workflow construction allows a new workflow to declaratively specify a stage for a workflow using these pre-defined modules without actually having to write any code. This makes the DCG system an incredibly useful and expressive data orchestration formalism for rapidly instantiating new data driven decision systems that rely on ingesting, normalizing, persisting, and finding insight from data. A custom domain specific language (DSL) supports the functionality of the workflow mapper 605.

Figure 8A:
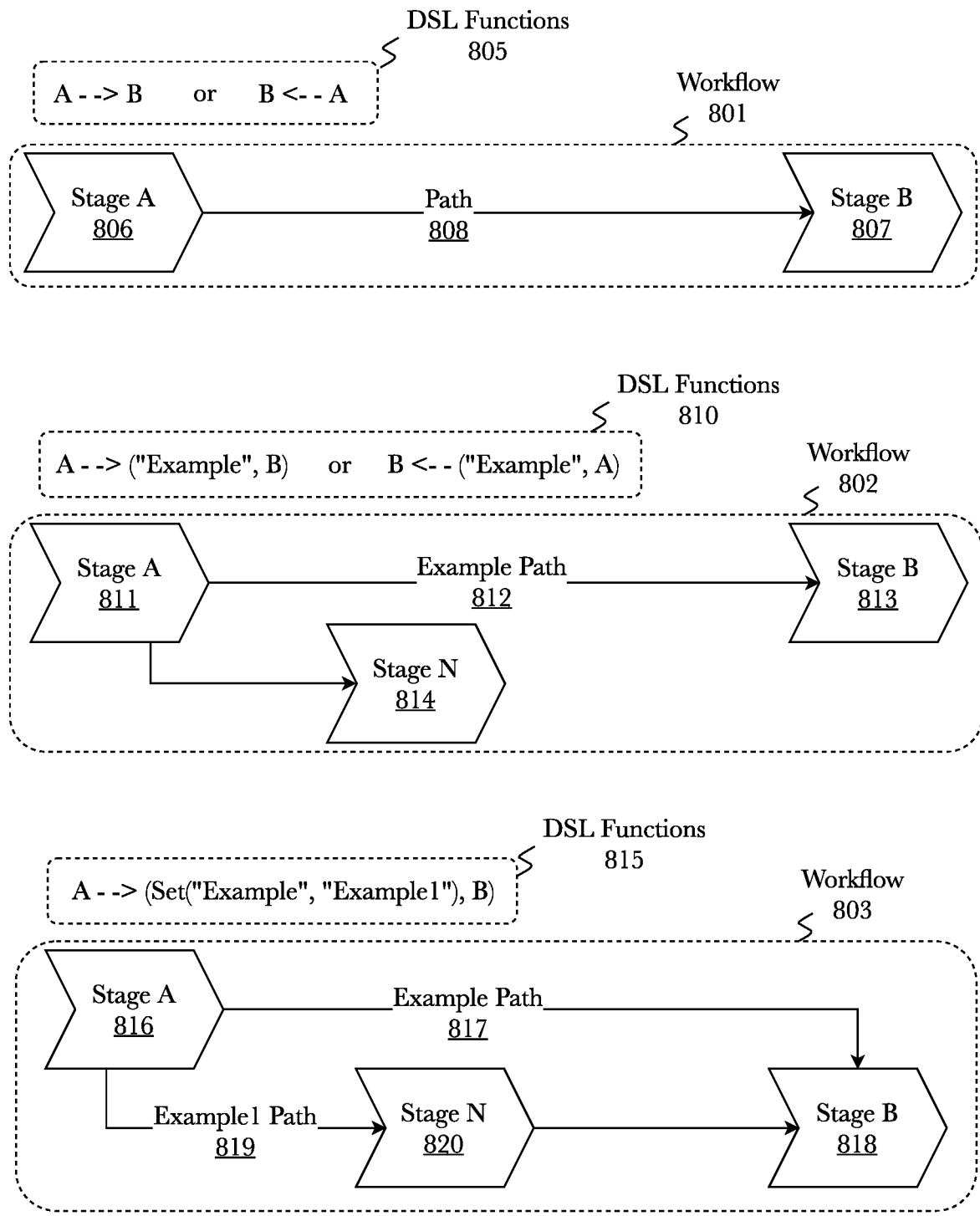
FIG. 8A is an exemplary diagram illustrating how a declarative workflow specification is supported using a domain specific language for expressing data orchestration workflows as directed cyclic graphs.

FIG. 8A is an exemplary diagram illustrating how a declarative workflow specification 801, 802, 803 is supported using a domain specific language for expressing data orchestration workflows as directed cyclic graphs. The diagram shows various environmental connections 800 which can be declaratively specified using a custom domain specific language (DSL). Some operations define paths 808, 812, 817, 819, which occurs when a stage has more than one output that needs to be selected. Multiple paths may be selected when specifying the environmental connection(s) 800. The use of paths allows the DSL to express declarative workflows specifications as directed cyclic graphs such that transformation stages may be sequenced in various configurations that allow a transformation stage to: receive upstream output from multiple prior stages, such is the case in a multiple-parent relationship; inform one or more downstream stages through conditional and selective operations directing output, such is the case in a multiple-child relationship; and inform stages that are already part of the workflow, such is the case in a cyclic relationship. The DSL is able to support the relationships mentioned above via various DSL functions 805, 810, 815 to facilitate graph building based on a declarative workflow specification.

Environmental connections 800 route a signal (e.g. streaming data, batch data, etc.) from one stage to another. Stages that have such a link will be executed in the order of \*\*from\*\* to \*\*to\*\* such that \*\*from\*\* A \*\*to\*\* B corresponds to the execution of stage A first, then followed by the execution of stage B. The following text provides examples of the various DSL functions 805, 810, 815 for making environmental connections 800. All examples make use of stage A and stage B for illustrative purposes only, and do not limit the amount of stages that may be specified and connected in various embodiments of the system.

According to an embodiment, DSL functions pertaining to environmental connections 800 are denoted by the form "→" and "←" as shown in DSL functions 805, 810, 815. The two DSL functions 805 are equivalent and describe the same behavior; stage B 807 has a dependency on stage A's 806 environment to finish before stage B 807 starts executing its task. This option is available when there is only one path 808 out of a stage.

According to an embodiment, the next set of DSL functions 810 specify the path dependencies between stages using the format of "A→("Example", B) or B←(Example", A), which describe the same dependency; stage B 813 has a dependency on stage A's 811 example path 812. When stage A 811 is done executing it will send a message, to start or skip, on the example path 812 which is received by stage B 813 and the appropriate response (i.e. to start stage B tasks, or to skip stage B tasks) is carried out by stage B 813. The DSL functions 810 define each parent-child route in a multiple-child relationship as is the case between stage A 811 and stages B 813 and N 814. In the event of trying to route a path that does not exist in stage A 811 such as trying to route a non-existent example2 path, a runtime failure will occur causing the workflow to cease so that the error may be addressed.

According to an embodiment, the DSL functions 815 apply to environmental connections 800 that are used for routing multiple signals from one stage to another stage. In this way DSL functions 815 support multiple-parent relationships that may be declaratively specified during workflow 803 creation. An example DSL function 815 is shown as "A→(Set("Example", "Example1", B)" which means that both example 817 and example1 819 signals from stage A 816 will be routed to stage B 818. Each signal path 817, 819 may be configured differently. Example path 817 routes stage A 816 signal directly to stage B 818, whereas example1 path 819 routes stage A 816 signal through an intermediate stage N 820 before being received at stage B 818. In this way, the DSL functions 805, 810, 815 can define an arbitrary amount of interconnections and express stage dependencies using a declarative workflow specification supported by the DSL.

Figure 8B:
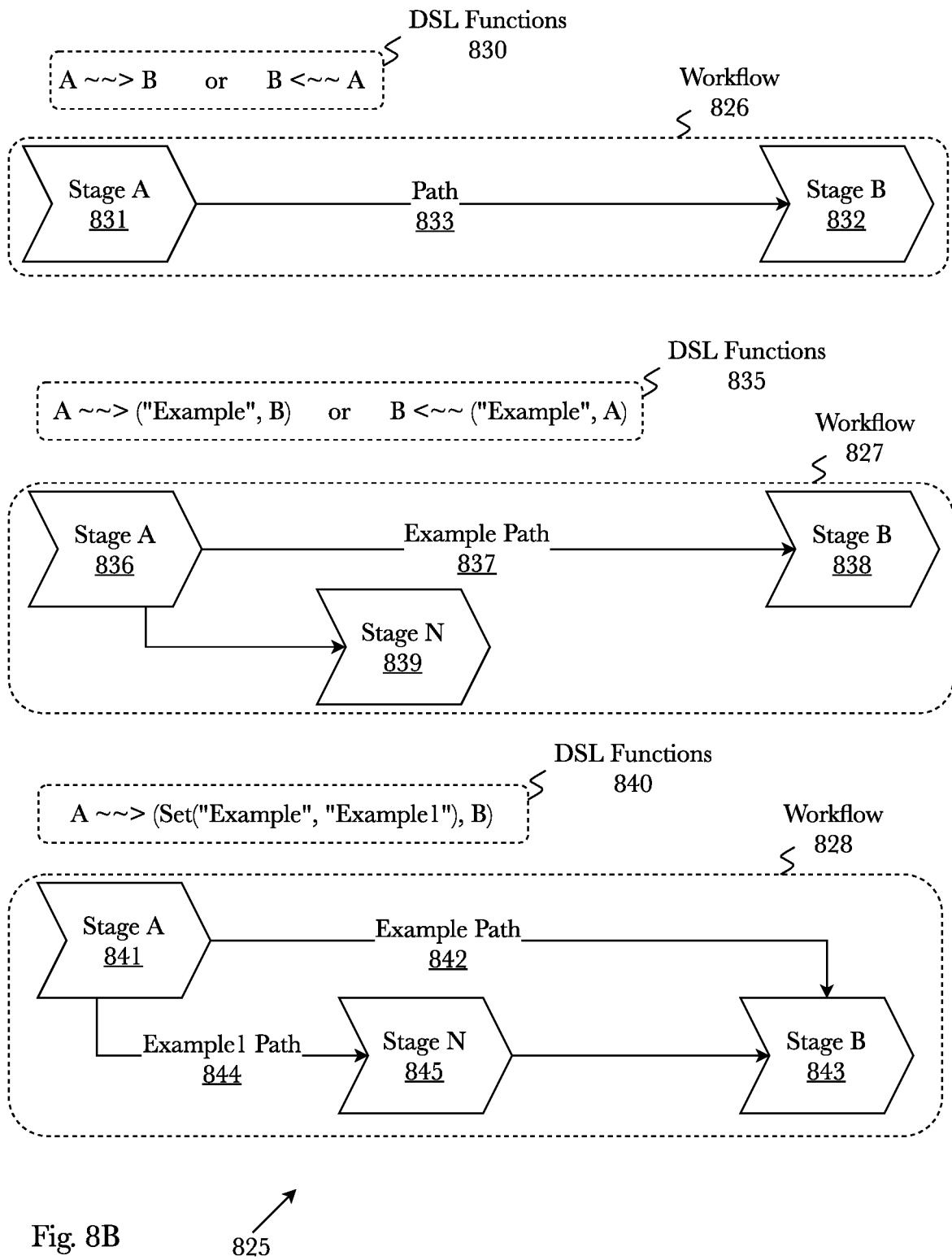
FIG. 8B is another exemplary diagram illustrating how a declarative workflow specification is supported using a domain specific language for expressing data orchestration workflows as directed cyclic graphs.

FIG. 8B is an exemplary diagram illustrating how a declarative workflow specification 826, 827, 828 is supported using a domain specific language for expressing data orchestration workflows as directed cyclic graphs. The diagram shows various data processing connections 825 which can be declaratively specified using a custom domain specific language (DSL). Some operations define \*\*paths\*\* 833, 837, 842, 844, which occurs when a stage has more than one output that needs to be selected. Multiple paths may be selected when specifying the data processing connection(s) 825. The use of paths allows the DSL to express declarative workflow specifications as directed cyclic graphs such that transformation stages may be sequenced in various configurations that allow a transformation stage to: receive upstream output from multiple prior stages, such is the case in a multiple-parent relationship; inform one or more downstream stages through conditional and selective operations directing output, such is the case in a multiple-child relationship; and inform stages that are already part of the workflow, such is the case in a cyclic relationship. The DSL is able to support the relationships mentioned above via various DSL functions 830, 835, 840 to facilitate graph building based on a declarative workflow specification.

Data processing connections 825 allow the result of one stage to be wired to the input of one or more stages. Connections between stages will only be made once, so if the DSL notes it only once there will only ever be one edge associated with that stage. Similarly to how environmental connections work, data will flow \*\*from\*\* to \*\*to\*\* such that if there is a data connection \*\*from\*\* A \*\*to\*\* B, stage A data processing step will be applied before stage B data processing step. All examples make use of stage A and stage B for illustrative purposes only, and do not limit the amount of stages that may be specified and connected in various embodiments of the system.

According to an embodiment, DSL functions pertaining to data processing connections 825 are denoted by the form "~~>" and "<~~" as shown in DSL functions 830, 835, 840. The two DSL functions 830 are equivalent and describe the same behavior; stage B 832 will receive data elements from stage A 831. This function is only applicable in cases where there is only a single path 833 between one stage and another. If the data output type of stage A 831 conflicts with the input type of stage B 832, then the workflow 826 will encounter validation issues when it reaches the backend of the DCG where workflow serialization and validation occur.

According to an embodiment, the next set of DSL functions 835 specify the path dependencies between stages using the format "A~~>("Example", B)" or "B<~~("Example", A)" which describe the same dependency; stage B 838 has a dependency on stage A 836 output path named "Example" 837 and will only receive data pushed through that path. Theses DSL functions 835 are only available when stage A 836 has more than one output path. The DSL functions 835 define each parent-child route in a multiple-child relationship as is the case between stage A 836 and stages B 838 and N 839. In the event of trying to route a path that does not exist in stage A 836 such as trying to route a non-existent example2 path, a runtime failure will occur causing the workflow 827 to cease so that the error may be addressed.

According to an embodiment, the DSL functions 840 apply to data processing connections 825 that are used for routing multiple data output paths from one stage to another stage. In this way DSL functions support multiple-parent relationships that may be declaratively specified during workflow 828 creation. An example DSL function 840 is shown as "A~~>(Set("Example", "Example1"), B)" which means that stage B 843 has a dependency on stage A's 841 output paths named "Example" 842 and "Example1" 844 and will only receive data pushed through those paths. The function 840 will only be available when stage A 841 has more than one output path. Each data output path 842, 844 may be configured differently. Example path 842 routes stage A 841 output directly to stage B 843, whereas example1 path 844 routes stage A 841 output through an intermediate stage N 845 before being received at stage B 843. In this way, the DSL functions 830, 835, 840 can define an arbitrary amount of interconnections and express stage dependencies using a declarative workflow specification supported by the DSL.

Figure 8C:
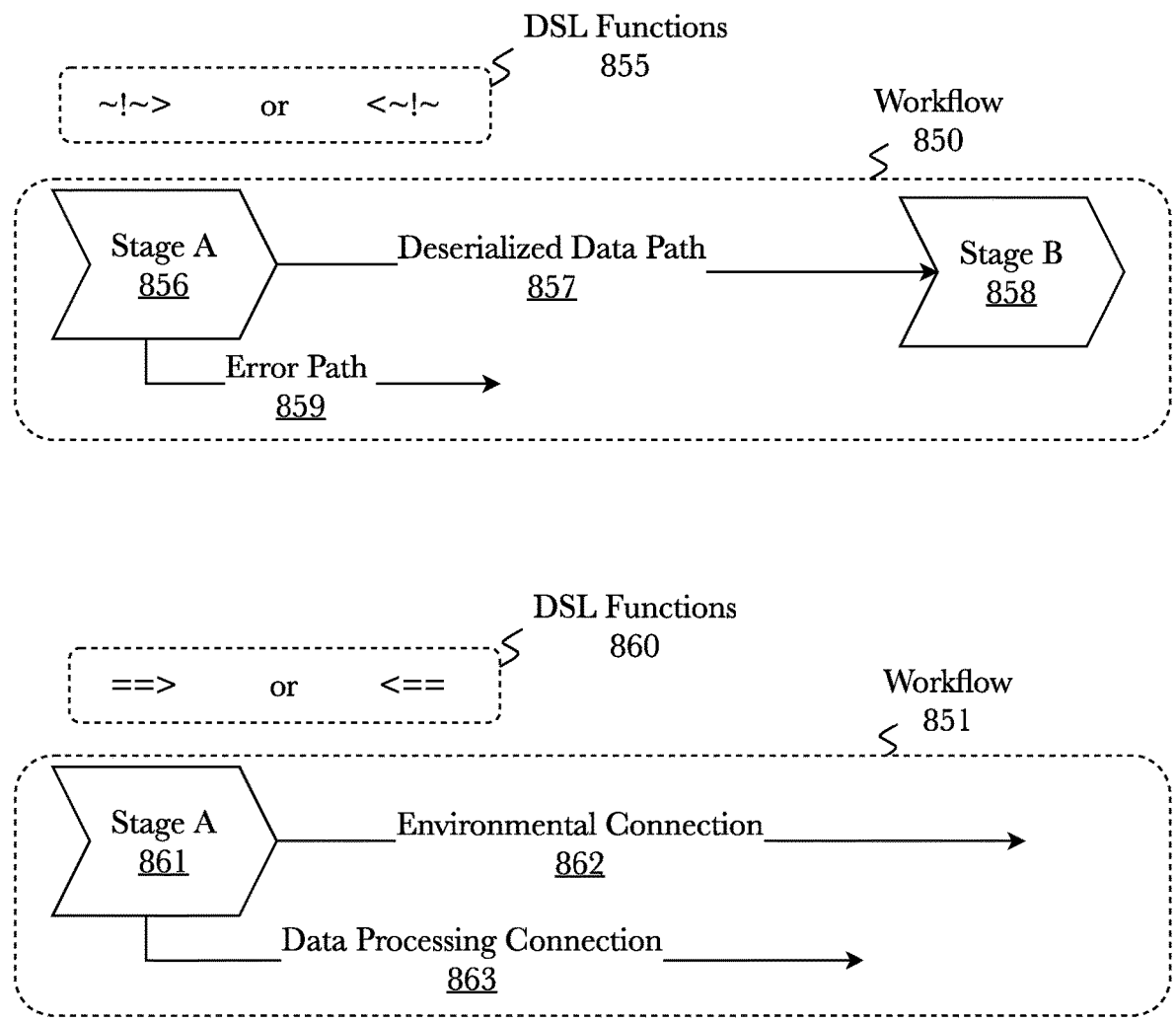
FIG. 8C is an exemplary diagram illustrating more domain specific language functions which may be used to support the creation of declarative workflow specifications expressed as directed cyclic graphs.

FIG. 8C is an exemplary diagram illustrating more DSL functions 855, 860 which may be used to support the creation of declarative workflow specifications 850, 851 expressed as directed cyclic graphs. The diagram shows special data processing connection functions 855 "~!~>" and "<~!~" only available to stages that have an error path 859 to route data out of. As an example, a source stage A 856 needs to deserialize the data, if the deserialization process fails the data will be pushed through an error path 859 rather than the deserialized path 857 to the next stage 858 in the workflow 850. The presence of a data stream flowing through the error path 859 may be detected by the DCG backend performing workflow monitoring so that human, machine, or some combination of human-machine actions may be performed to correct the error.

DSL functions 860 "==>" and "<==" are used to represent that a stage 861 may have both an environmental connection 862 and data processing connection 863. This only applies to stages that are data processing stages as environmental connections in these stages only have one output path. Otherwise, this function 860 behaves the same as data processing connection DSL functions 830, FIG. 8B, "~~>" and "<~~".

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof.

In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
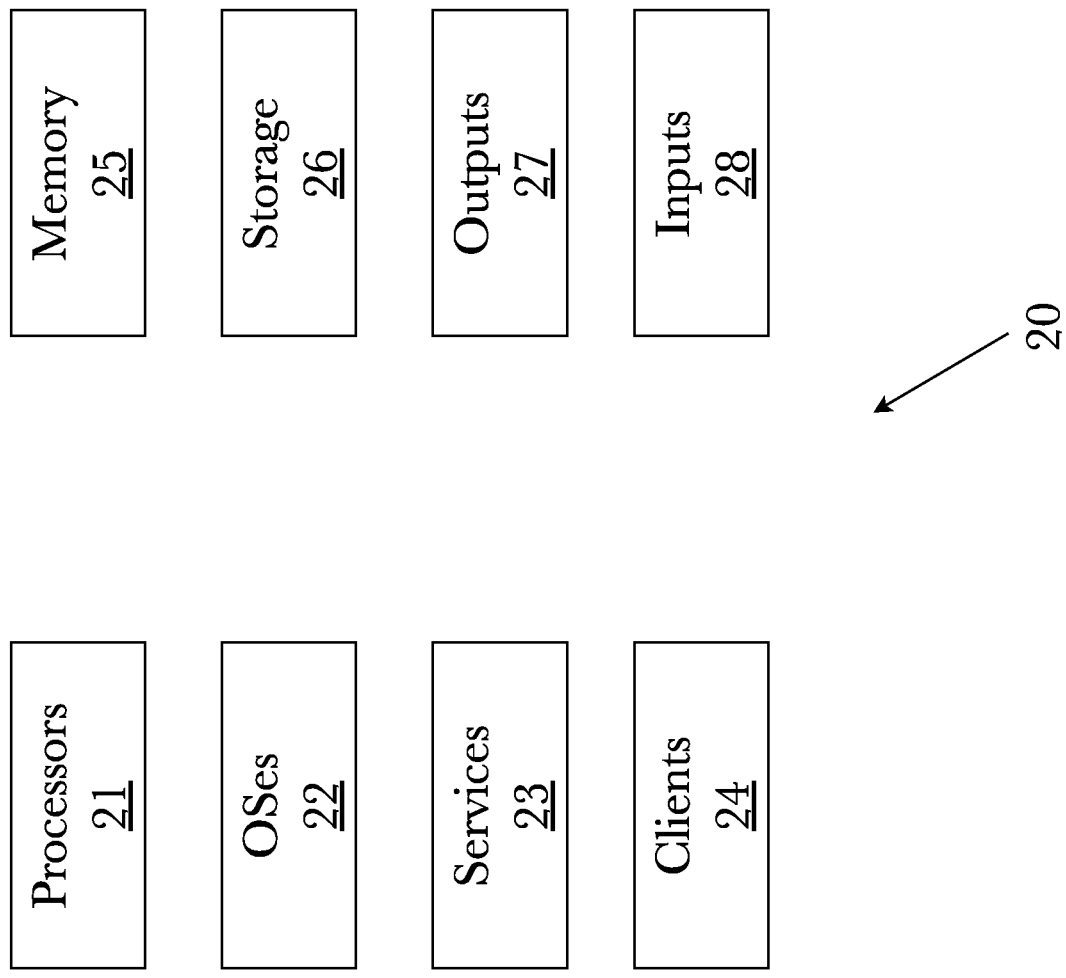
FIG. 10 is a block diagram illustrating an exemplary logical architecture for a client device, according to various embodiments of the invention.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
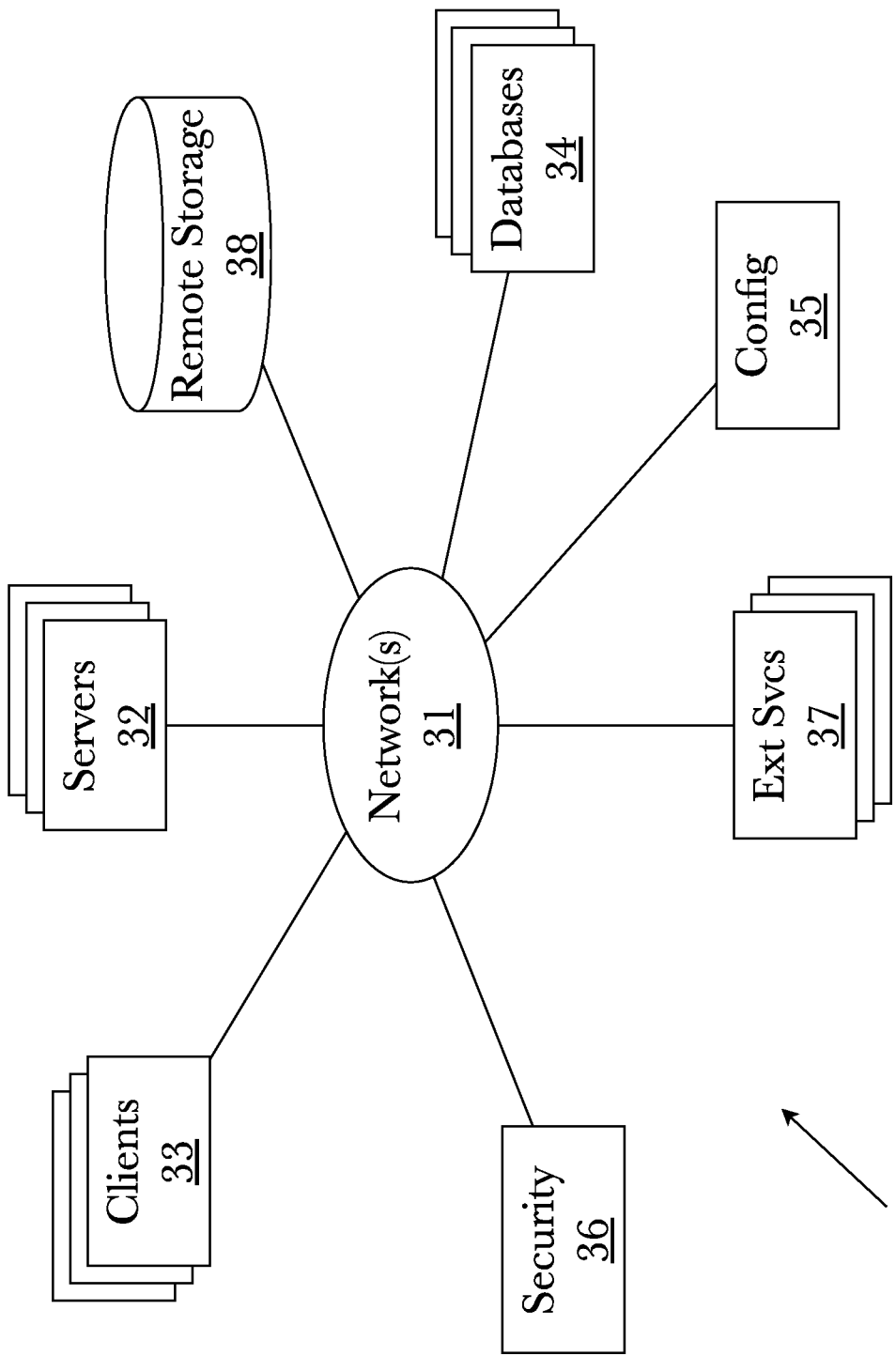
FIG. 11 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
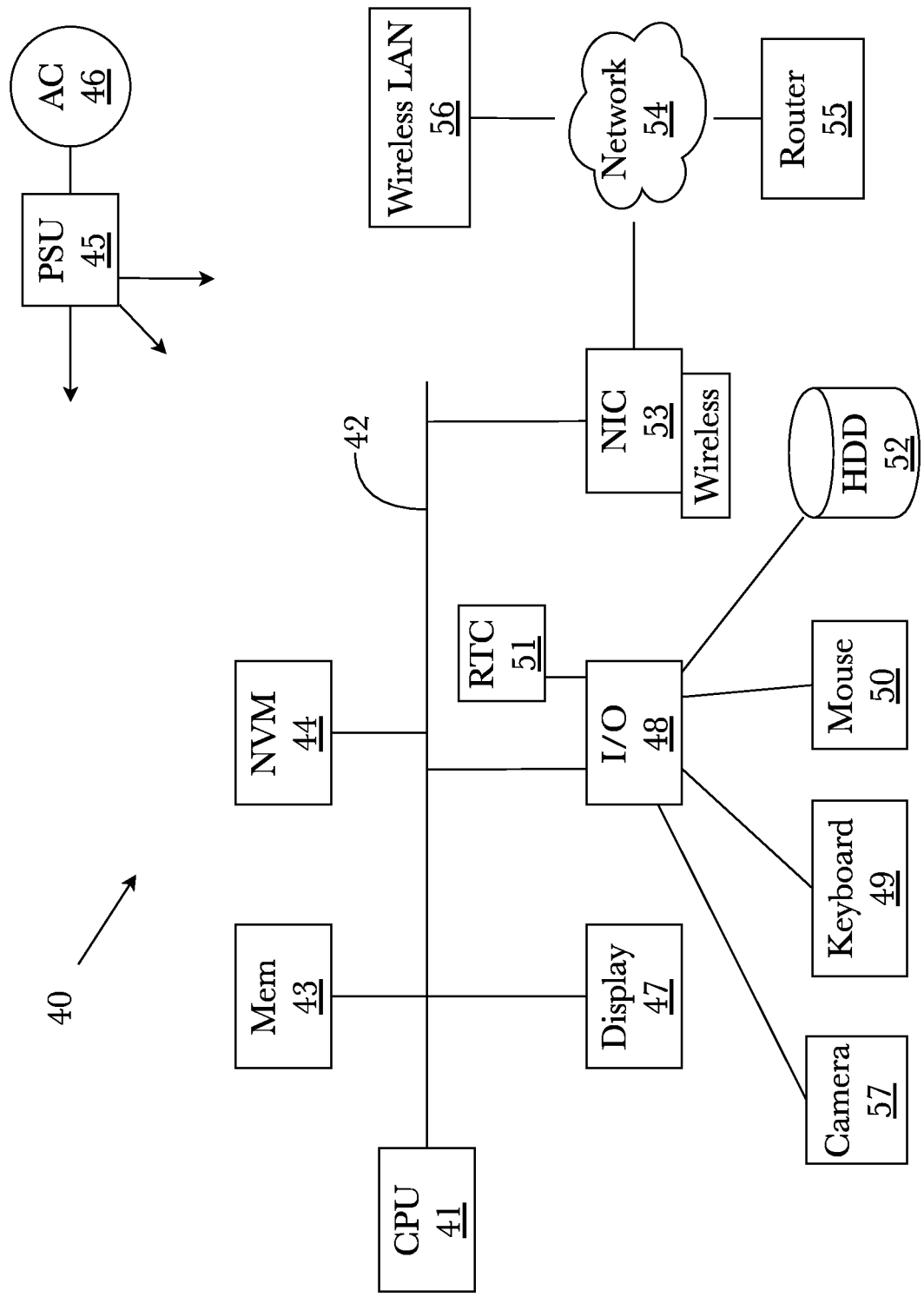
FIG. 12 is a block diagram illustrating an exemplary overview of a computer system as may be used in any of the various locations throughout the system

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

What is claimed is:

1. A system for creating and implementing data processing workflows using a distributed computational graph comprising:

a computing device comprising a memory, a processor, and a non-volatile data storage device;

a front end comprising a first plurality of programming instructions stored in the memory of, and operating on the processor of, the computing device, wherein the first plurality of programming instructions, when operating on the processor, cause the computing device to:

provide a graphical user interface for creation of a distributed computational graph representing a data processing workflow, wherein:

the graphical user interface comprises icons representing data processing modules and connections between the modules;

the distributed computational graph comprises one or more of the data processing modules represented as nodes of the distributed computational graph and connections between the data processing modules represented as edges of the distributed computational graph; and one or more of the nodes of the distributed computational graph is a data processing module that contains code for accessing an application programing interface (API) of a cloud-based data processing service;

send the distributed computational graph to a system back end for implementation of the data processing workflow; and a system back end comprising a second plurality of programming instructions stored in the memory of, and operating on the processor of, the computing device, wherein the second plurality of programming instructions, when operating on the processor, cause the computing device to:

receive the distributed computational graph;

construct the data processing workflow from the distributed computational graph using the application programing interface that generates workflow code via representational state transfer calls;

instantiate and validate the data processing workflow using the workflow code; prepare the data processing workflow for processing by initializing one or more of: software components, devices, cloud-based services;

serialize the data processing workflow as a series of processing events;

execute the processing events using a data processing engine.

2. A method for creating data processing workflows using modules, comprising the steps of:

providing a graphical user interface for creation of a distributed computational graph representing a data processing workflow, wherein:

the graphical user interface comprises icons representing data processing modules and connections between the modules;

the distributed computational graph comprises one or more of the data processing modules represented as nodes of the distributed computational graph and connections between the data processing modules represented as edges of the distributed computational graph; and one or more of the nodes of the distributed computational graph is a data processing module that contains code for accessing an application programing interface (API) of a cloud-based data processing service;

constructing the data processing workflow from the distributed computational graph using the application programing interface that generates workflow code via representational state transfer calls;

instantiating and validating the data processing workflow using the workflow code;

preparing the data processing workflow for processing by initializing one or more of: software components, devices, cloud-based services;

serializing the data processing workflow as a series of processing events; and executing the processing events using a data processing engine.

* * * * *